US010902000B2

(12) United States Patent
Bishnoi et al.

(10) Patent No.: US 10,902,000 B2
(45) Date of Patent: Jan. 26, 2021

(54) HEARTBEAT PROPAGATION IN A DISTRIBUTED STREAM PROCESSING SYSTEM

(71) Applicant: Oracle International Corporation, Redwood Shores, CA (US)

(72) Inventors: Sandeep Bishnoi, Mill Valley, CA (US); Hoyong Park, San Jose, CA (US); Subhrajyoti Choudhury, Bangalore (IN); Yathish Gatty, Bangalore (IN); Devendra Jain, Noida (IN); Santosh Kumar, Bangalore (IN); Prabhu Thukkaram, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 235 days.

(21) Appl. No.: 16/121,490

(22) Filed: Sep. 4, 2018

(65) Prior Publication Data

US 2019/0102435 A1    Apr. 4, 2019

(30) Foreign Application Priority Data

Sep. 29, 2017  (IN) .............................. 201741034654

(51) Int. Cl.
*G06F 16/2455* (2019.01)
*G06F 16/2458* (2019.01)

(52) U.S. Cl.
CPC .... *G06F 16/24568* (2019.01); *G06F 16/2471* (2019.01)

(58) Field of Classification Search
None
See application file for complete search history.

(56) References Cited

U.S. PATENT DOCUMENTS

| 6,125,368 A | 9/2000 | Bridge et al. |
| 7,523,143 B2 | 4/2009 | Wong et al. |

(Continued)

FOREIGN PATENT DOCUMENTS

WO    2017157438    9/2017

OTHER PUBLICATIONS

Srivastava et al, Flexible Time Management in Data Stream Systems, Jun. 2004, ACM, pp. 263-274 (Year: 2004).*

(Continued)

*Primary Examiner* — Robert W Beausoliel, Jr.
*Assistant Examiner* — Cheryl M Shechtman
(74) *Attorney, Agent, or Firm* — Kilpatrick Townsend & Stockton LLP

(57) ABSTRACT

An event processing system for distributing a continuous query, and processing events in an event stream, is disclosed. The system can synchronize timestamps across all partitions by adding a heartbeat propagator component propagating a heartbeat signal for silent partitions. The system can further include a timestamp tracker component that tracks the maximum observed timestamp across all partitions for each batch, and sends this to each partition. The system can distribute partitions of the events to the worker nodes, and instruct a heartbeat propagator component to generate a heartbeat for a first worker node corresponding to an event in a different partition. The system receives outputs from the worker nodes and combines these into a single result corresponding to a continuous query. The system can further implement a timestamp tracker to select a highest timestamp value of a previous batch, and send the value to the worker nodes.

20 Claims, 11 Drawing Sheets

(56) References Cited

U.S. PATENT DOCUMENTS

| | | | |
|---|---|---|---|
| 8,195,648 B2 | 6/2012 | Zabback et al. | |
| 8,583,769 B1* | 11/2013 | Peters | H04L 12/42 709/221 |
| 9,059,935 B2 | 6/2015 | Hudzia et al. | |
| 9,189,280 B2 | 11/2015 | Park et al. | |
| 9,239,864 B2* | 1/2016 | Krishnamurthy | G06F 16/24532 |
| 9,244,978 B2 | 1/2016 | Alves et al. | |
| 9,418,113 B2 | 8/2016 | Bishnoi et al. | |
| 9,674,249 B1 | 6/2017 | Kekre et al. | |
| 9,756,104 B2 | 9/2017 | Shukla et al. | |
| 10,417,102 B2* | 9/2019 | Sanakkayala | G06F 11/1438 |
| 2011/0145828 A1 | 6/2011 | Takahashi et al. | |
| 2011/0302164 A1* | 12/2011 | Krishnamurthy | G06F 16/90335 707/737 |
| 2011/0314019 A1 | 12/2011 | Jimenez Peris et al. | |
| 2012/0317579 A1 | 12/2012 | Liu | |
| 2014/0095535 A1* | 4/2014 | Deshmukh | G06F 16/2474 707/769 |
| 2014/0201355 A1 | 7/2014 | Bishnoi et al. | |
| 2014/0358959 A1* | 12/2014 | Bishnoi | G06F 16/24568 707/769 |
| 2015/0134626 A1 | 5/2015 | Theimer et al. | |
| 2017/0116289 A1 | 4/2017 | Deshmukh et al. | |
| 2018/0011902 A1* | 1/2018 | Welton | G06F 16/27 |
| 2018/0089278 A1* | 3/2018 | Bhattacharjee | H04L 43/08 |
| 2019/0095510 A1* | 3/2019 | Cruise | G06Q 10/10 |

OTHER PUBLICATIONS

Arasu, "Continuous Queries over Data Streams", available online at https://pdfs.semanticscholar.org/483b/9af341766583d213b857a785396125fd4ea1.pdf, Feb. 2006, 208 pages.

Balkesen et al., "Scalable Data Partitioning Techniques for Parallel Sliding Window Processing over Data Streams", Available online at: https://www.inf.ethz.ch/personal/cagri.balkesen/publications/dmsn2011.pdf 8th International Workshop on Data Management for Sensor Networks, Aug. 29, 2011, pp. 1-6.

Cuzzocrea, "Intelligent Techniques for Warehousing and Mining Sensor Network Data", Available online at: https://epdf.tips/intelligent-techniques-for-warehousing-and-mining-sensor-network-data.html or https://books.google.co.in/books?id=gZb8UZXbQLcC&printsec=frontcover#v=onepage&q&f=false, 2009, 425 pages.

Johnson et al., "A Heartbeat Mechanism and its Application in Gigascope", Available online at: https://pdfs.semanticscholar.org/5584/cde7e3918c5182e8becc8275d749c9e0bffe.pdf, 2005, 10 pages.

Lamport, "Time, Clocks, and the Ordering of Events in a Distributed System", Communications of the ACM, vol. 21, No. 7, Jul. 1978, pp. 558-565.

Markos, "Distributed stream processing", Available online at: https://is.muni.cz/th/395600/fi_m/thesis.pdf, 2015, 62 pages.

* cited by examiner

HEARTBEAT PROPAGATION IN A DISTRIBUTED STREAM PROCESSING SYSTEM

CROSS-REFERENCE TO RELATED APPLICATION

The present application is a non-provisional of India Application No. 201741034654, filed Sep. 29, 2017, the entire contents of which is herein incorporated by reference for all purposes. This application is also related to application Ser. No. 15/696,501, filed Sep. 6, 2017; entitled "PROCESSING TIMESTAMPS AND HEARTBEAT EVENTS FOR AUTOMATIC TIME PROGRESSION;" application Ser. No. 15/700,784, filed Sep. 11, 2017 entitled "DATA SERIALIZATION IN A DISTRIBUTED EVENT PROCESSING SYSTEM;" application Ser. No. 15/700,862, filed Sep. 11, 2017, entitled "GRAPH GENERATION FOR A DISTRIBUTED EVENT PROCESSING SYSTEM;" application Ser. No. 15/700,914, filed Sep. 11, 2017, entitled "CLUSTERING EVENT PROCESSING ENGINES;" and application Ser. No. 15/701,019, filed Sep. 11, 2017, entitled "DATA PARTITIONING AND PARALLELISM IN A DISTRIBUTED EVENT PROCESSING SYSTEM," the entire contents of which are hereby incorporated by reference as if fully set forth herein.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs.

BRIEF SUMMARY

Techniques are provided (e.g., a method, a system, non-transitory computer-readable medium storing code or instructions executable by one or more processors) for distributing a continuous query and processing events of an event stream.

In an embodiment, the system receives a plurality of events in a stream. The system deploys a query plan for a continuous query to a master node and a plurality of worker nodes, a respective worker node of the plurality of worker nodes implementing a respective heartbeat propagator component and a respective continuous query engine. The system distributes a first partition of the plurality of events to the master node and to a first worker node in the plurality of worker nodes. The system further distributes a second partition of the plurality of events to the master node and to a second worker node in the plurality of worker nodes. The system configures the master node to instruct a first heartbeat propagator component implemented on the first worker node to propagate a first heartbeat for the first worker node, the first heartbeat corresponding to an event in the second partition. The system receives, from the first worker node, a first output identifying a first partition result, the first output being based at least in part on the first heartbeat and the query plan. The system receives, from the second worker node, a second output identifying a second partition result. The system combines the first output and the second output into a single result corresponding to the continuous query. The system outputs the single result corresponding to the continuous query for a user.

In a variation on this embodiment, a respective event of the plurality of events comprises a respective timestamp value. The plurality of events are organized into batches. The master node implements a timestamp tracker configured to receive, from the plurality of worker nodes, a plurality of highest partition timestamp values of a first batch. The timestamp tracker is further configured to select, from the plurality of highest partition timestamp values, a highest timestamp value of the first batch. The timestamp tracker is further configured to send the highest timestamp value of the first batch to the plurality of worker nodes.

In a variation on this embodiment, the first heartbeat indicates a time associated with the event in the second partition, and is propagated from the second node by shuffling or broadcasting to the plurality of worker nodes.

In a variation on this embodiment, the continuous query comprises a temporal relation with a time window.

In a variation on this embodiment, distributing the first partition is performed based at least in part on a load balancing function or a partitioning function.

In a variation on this embodiment, each event of the plurality of events comprises a timestamp and a value.

In a variation on this embodiment, the first partition result and the second partition result are combined based at least in part on a union operator.

In a variation on this embodiment, the respective heartbeat propagator component of the respective worker node propagates a plurality of heartbeats indicating times and received from each worker node other than the respective worker node.

Some, any, or all of the above features may be implemented as a method, system, or computer-readable storage medium. The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
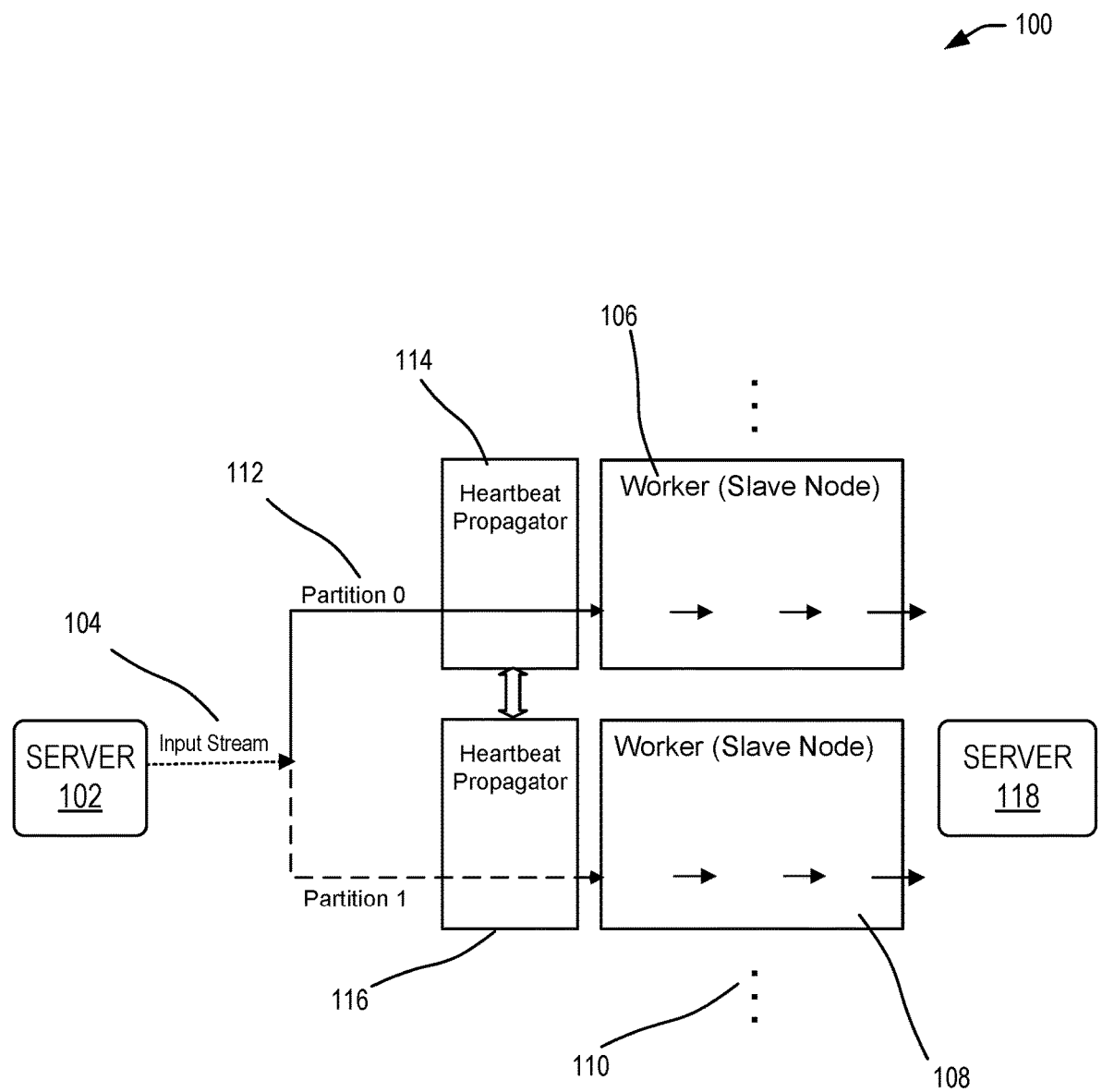
FIG. 1 illustrates example distributed computing nodes processing a partitioned event stream, in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL) which allows applications to filter, query, and perform pattern matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

. . .
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
. . .

In the above stream, for stream element (<timestamp_N+1>, <ORCL,62>), the event is <ORCL,62> with attributes "stock_symbol" and "stock value." The timestamp associated with the stream element is "timestamp_N+1". A continuous event stream is thus a flow of events, each event having the same series of attributes.

As noted, a stream may be the principal source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation, that archived relation may also indicate that there are certain entities it can call to query for historical context, for example. In some examples, a data definition language (DDL) may indicate annotations about the archived relation such as, but not limited to, how do to the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, down-stream operators. So, one approach is to store this entire table here. However, utilizing archived relations, the system may analyze the query graph and decide which of the lowest stateful operator that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum(c1) from R1 where c2>c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archived relation may be specified by a user. A window, in some aspects, in relation to an archived relation, may include a node in a query graph that analyzes or otherwise evaluates incoming streamed content. In other words, the window may define the amount of streamed content that be analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples which are within window limits may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspects, the CQL engine and/or CEP engine may traditionally process streams or non-archived relations, so there may be no initial state. For example, a query may be loaded, wherein it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it runs the query, things can go into JMS and be published where the engine wasn't listening. So, the engine may be configured to setup the listener first, run the archive query, and then return and start pulling out of the queue, in order to avoid missing any events. Thus, the JMS may queue things up and, if things back up while the engine is doing a query, the engine can catch up later and it doesn't have to worry about whether it's synchronous. If it's not here, listening, it won't miss it, it just gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context)wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS. Additionally, in some cases, multiple output servers may be utilized (in compliance with JTA and/or to implement high availability (HA), wherein each server may manage a single set of context/transaction tables that are completely separate from the other tables managed by the other servers.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.
Event Processing Applications The quantity and speed of both raw infrastructure and business events is exponentially growing in IT environments. Whether it is streaming stock data for financial services, streaming satellite data for the military or real-time vehicle-location data for transportation and logistics businesses, companies in multiple industries must handle large volumes of complex data in real-time. In addition, the explosion of mobile devices and the ubiquity of high-speed connectivity adds to the explosion of mobile data. At the same time, demand for business process agility and execution has also grown. These two trends have put pressure on organizations to increase their capability to support event-driven architecture patterns of implementation. Real-time event processing requires both the infrastructure and the application development environment to execute on event processing requirements. These requirements often include the need to scale from everyday use cases to extremely high velocities of data and event throughput, potentially with latencies measured in microseconds rather than seconds of response time. In addition, event processing applications must often detect complex patterns in the flow of these events.

The Oracle Stream Analytics platform targets a wealth of industries and functional areas. The following are some use cases:

Telecommunications: Ability to perform real-time call detail (CDR) record monitoring and distributed denial of service attack detection.

Financial Services: Ability to capitalize on arbitrage opportunities that exist in millisecond or microsecond windows. Ability to perform real-time risk analysis, monitoring and reporting of financial securities trading and calculate foreign exchange prices.

Transportation: Ability to create passenger alerts and detect baggage location in case of flight discrepancies due to local or destination-city weather, ground crew operations, airport security, etc.

Public Sector/Military: Ability to detect dispersed geographical enemy information, abstract it, and decipher high probability of enemy attack. Ability to alert the most appropriate resources to respond to an emergency.

Insurance: Ability to learn and to detect potentially fraudulent claims.

IT Systems: Ability to detect failed applications or servers in real-time and trigger corrective measures.

Supply Chain and Logistics: Ability to track shipments in real-time and detect and report on potential delays in arrival.
Real Time Streaming & Event Processing Analytics With exploding data from increased number of connected devices, there is an increase in large volumes of dynamically changing data; not only the data moving within organizations, but also outside the firewall. High-velocity data brings high value, especially to volatile business processes. However, some of this data loses its operational value in a short time frame. Big Data allows the luxury of time in processing for actionable insight. Fast Data, on the other hand, requires extracting the maximum value from highly dynamic and strategic data. It requires processing much faster and facilitates taking timely action as close to the generated data as possible. The Oracle Stream Analytics platform delivers on Fast Data with responsiveness. Oracle Edge Analytics pushes processing to the network edge, correlating, filtering and analyzing data for actionable insight in real-time.

The Oracle Stream Analytics platform provides ability to join the incoming streaming events with persisted data, thereby delivering contextually aware filtering, correlation, aggregation and pattern matching. It delivers lightweight, out of the box adapters for common event sources. It also provides an easy-to-use adapter framework for custom adapter development. With this platform, organizations can identify and anticipate opportunities, and threats represented by seemingly unrelated events. Its incremental processing paradigm can process events using a minimum amount of resources providing extreme low latency processing. It also allows it to create extremely timely alerts, and detect missing or delayed events immediately, such as the following:

Correlated events: If event A happens, event B almost always follows within 2 seconds of it.

Missing or Out-of-Sequence events: Events A, B, C should occur in order. C is seen immediately after A, without B.

Causal events: Weight of manufactured items is slowly trending lower or the reading falls outside acceptable norms. This signals a potential problem or future maintenance need.

In addition to real-time event sourcing, the Oracle Stream Analytics platform design environment and runtime execution supports standards-based, continuous query execution across both event streams and persisted data stores like databases and high performance data grids. This enables the platform to act as the heart of intelligence for systems needing answers in microseconds or minutes to discern patterns and trends that would otherwise go unnoticed. Event Processing use cases require the speed of in-memory processing with the mathematical accuracy and reliability of standard database SQL. This platform queries listen to incoming event streams and execute registered queries continuously, in-memory on each event, utilizing advanced, automated algorithms for query optimization. While based on an in-memory execution model, however, this platform leverages standard ANSI SQL syntax for query development, thus ensuring accuracy and extensibility of query construction. This platform is fully compliant with the ANSI SQL '99 standard and was one of the first products available in the industry to support ANSI SQL reviewed extensions to standard SQL for real-time, continuous query pattern matching. The CQL engine optimizes the execution of queries within a processor leaving the developer to focus more on business logic rather than optimization.

The Oracle Stream Analytics platform allows for both SQL and Java code to be combined to deliver robust event processing applications. Leveraging standard industry terminology to describe event sources, processors, and event output or sinks, this platform provides a meta-data driven approach to defining and manipulating events within an application. Its developers use a visual, directed-graph canvas and palette for application design to quickly outline the flow of events and processing across both event and data sources. Developing the flow through drag and drop modeling and configuration wizards, the developer can then enter the appropriate metadata definitions to connect design to implementation. When necessary or preferred, with one click, developers are then able to drop into custom Java code development or use the Spring® framework directly to code advanced concepts into their application.

Event driven applications are frequently characterized by the need to provide low and deterministic latencies while handling extremely high rates of streaming input data. The underpinning of the Oracle Stream Analytics platform is a lightweight Java container based on an OSGi® backplane. It contains mature components from the WebLogic JEE application server, such as security, logging and work management algorithms, but leverages those services in a real-time event-processing environment. An integrated real-time kernel provides unique services to optimize thread and memory management supported by a JMX framework enabling the interaction with the container for performance and configuration. Web 2.0 rich internet applications can communicate with the platform using the HTTP publish and subscribe services, which enables them to subscribe to an application channel and have the events pushed to the client. With a small footprint this platform is a lightweight, Java-based container, that delivers faster time-to-production and lower total cost of ownership.

The Oracle Stream Analytics platform has the ability to handle millions of events per second with microseconds of processing latencies on standard, commodity hardware or optimally with Oracle Exalogic and its portfolio of other Engineered Systems. This is achieved through a complete "top-down" layered solution, not only with a design focus on high performance event processing use cases, but also a tight integration with enterprise-class real-time processing infrastructure components. The platform architecture of performance-oriented server clusters focuses on reliability, fault tolerance and extreme flexibility with tight integration into the Oracle Coherence technology and enables the enterprise to predictably scale mission-critical applications across a data grid, ensuring continuous data availability and transactional integrity.

In addition, this platform allows for deterministic processing, meaning the same events can be fed into multiple servers or the same server at different rates achieving the same results each time. This enables incredible advantages over systems that only rely on the system clock of the running server.

The techniques described above and below may be implemented in a number of ways and in a number of contexts. Several example implementations and contexts are provided with reference to the following figures, as described below in more detail. However, the following implementations and contexts are but a few of many.

Oracle Stream Analytics Architecture

Embodiments of the present disclosure provide techniques for receiving and processing data streaming from an event source. In various embodiments, the Oracle Stream Analytics system comprises a Stream Analytics server, Stream Analytics Visualizer, a command-line administrative interface, and an Integrated Development Environment (IDE). The Stream Analytics server hosts logically related resources and services for running Stream Analytics applications. Servers may be grouped into and managed as domains. A domain can have one server (standalone-server domain) or many (multiserver domain). The Stream Analytics' domains and servers may be managed through the Stream Analytics Visualizer and the command-line administrative interface. In some embodiments, the Stream Analytics Visualizer is a web-based user interface through which Stream Analytics applications running on the Stream Analytics server are deployed, configured, tested, and monitored. In some embodiments, the command-line administrative interface enables a user to manage the server from the command line and through configuration files. For example, the user may start and stop domains and deploy, suspend, resume, and uninstall an applications. Advantageously, the Oracle Stream Analytics system is developed to simplify the complex event processing operations and make them available even to users without any technical background.

The Oracle Stream Analytics system adopts multi-layer software architecture. The Java Virtual Machine (JVM) provides most fundamental support at the lowest level. Above that is the OSGi framework, which manages the Java packages between software modules and deals with class versioning and loading. Spring Dynamic Modules lies above the OSGi framework, which is responsible for service instantiation and dependency injection. Above that comes the Oracle Stream Analytics server modules layer. This layer provides the core Oracle Stream Analytics functionality, including the CQL engine, server management and input/output data handling. The highest level in the architecture is the application layer.

A typical data flow through an Oracle Stream Analytics application starts from incoming event data streams. The data is converted and used by an adapter to create event objects that can be obtained by any component that registered to listen to the adapter. A channel is one of those components that can listen to adapters. Data goes through the channel all the way to the CQL processor component, which is able to efficiently process data using the query language (CQL). The output can be sent to downstream listeners.

Heartbeat Propagation in a Distributed Stream Processing System

Embodiments of the present disclosure provide techniques for scaling out temporal relations, such as time windows, in parallel in a distributed stream processing system. The system improves over previous systems by allowing parallelization of stateful operators such as time windows, and can synchronize timestamps across all partitions by adding a heartbeat propagator component propagating a heartbeat signal for silent partitions. In particular, the disclosed methods and system can measure and improve scalability, scalability-related performance issues, and elasticity, in distributed computations of continuous queries including temporal relations.

FIG. 1 illustrates example distributed computing nodes processing a partitioned event stream 100, in accordance with an embodiment of the present disclosure. In this example, a server 102, a plurality of client devices, or another source sends a continuous input stream 104 to a distributed cluster of computing resources for processing. In a typical example, the cluster's computing resources may include multiple processing elements, including worker nodes (in the case of a Spark cluster) or slave nodes, such as node 106 and node 108, additional computing nodes 110, processors, processor cores, GPUs, etc. In order to take advantage of the multiple computing resources and compute a relation on input stream 104 efficiently in parallel, server 102 and/or a master or head node can divide input stream 104 into multiple partitions, such as partition 112 (labeled "partition 0"), which can each comprise a subset of the input stream events. For example, server 102 and/or a master or head node can use shuffling, a load balancing function, a partitioning function, or any other method of distributing the input stream events, and is not limited by the present disclosure. In embodiments of the disclosed system, the partitioned stream events can be handled by components such as heartbeat propagators 114 and 116. In some embodiments, an optional timestamp tracker component may also handle the stream events, as will be described below. The partitioned stream events are then sent to node 106 and node 108 in the computing cluster, which can process the distributed stream events to compute a relation, such as a temporal relation, which can be stateful. In an example, the cluster may contain additional computing nodes 110 that can also process the partitioned stream events. The worker or slave nodes can send the output from their distributed computations to a target such as server 118 or a master or head node to be combined into a single computation result. For example, the master or head node can combine the output from the worker nodes by performing a union operation to include all the output from any of the nodes in a single result, with replicated or redundant results removed. In an embodiment, the single result may not have redundancies removed, or can be sorted, checked for inconsistencies, or combined by another method or another set operation, and is not limited by the present disclosure. In an embodiment, parallelization produces a result substantially equal to the serial result. That is, the combined result (e.g., union) of the respective output relations can equal or substantially equal the output relation, as it would be computed in serial from an unpartitioned stream.

In an embodiment, every event in the two partitions of stream 100 can pass through a respective heartbeat propagator component before being processed on the respective nodes 106 and 108. Heartbeat propagators 114 and 116 can ensure that, regardless of whether each partition of stream 100 is empty or contains events at a particular time, the corresponding worker or slave node receives at least one event, thereby resulting in timestamp progression. In particular, heartbeat propagators 114 and 116 ensure that each worker or slave node receives a heartbeat for silent partitions, so the system can accurately compute time window operations. Thus, with the disclosed system and methods, node 106 and node 108 can compute a stateful operator, such as a time window, in parallel on the partitioned stream.

As described above, applications of continuous event streams can include but are not limited to sensor data applications (e.g., temperature readings), financial tickers, network performance measuring tools (e.g., network traffic management), clickstream analysis, and vehicle traffic monitoring. Such event streams are, in principle, unbounded, and accordingly may produce very large volumes of data. In order to process this data in real time, the disclosed system and methods can distribute the event streams for parallel computation of a temporal relation. In particular, the computed temporal relation can involve a stateful operator such as a time window, and therefore may present challenges to parallelize. The disclosed system and methods can solve the problem of distributing computations involving stateful operators. For example, the system can be used in parallel in a data center to analyze time correlations among clickstream events from a major web site during a given day or hour.

Figure 2:
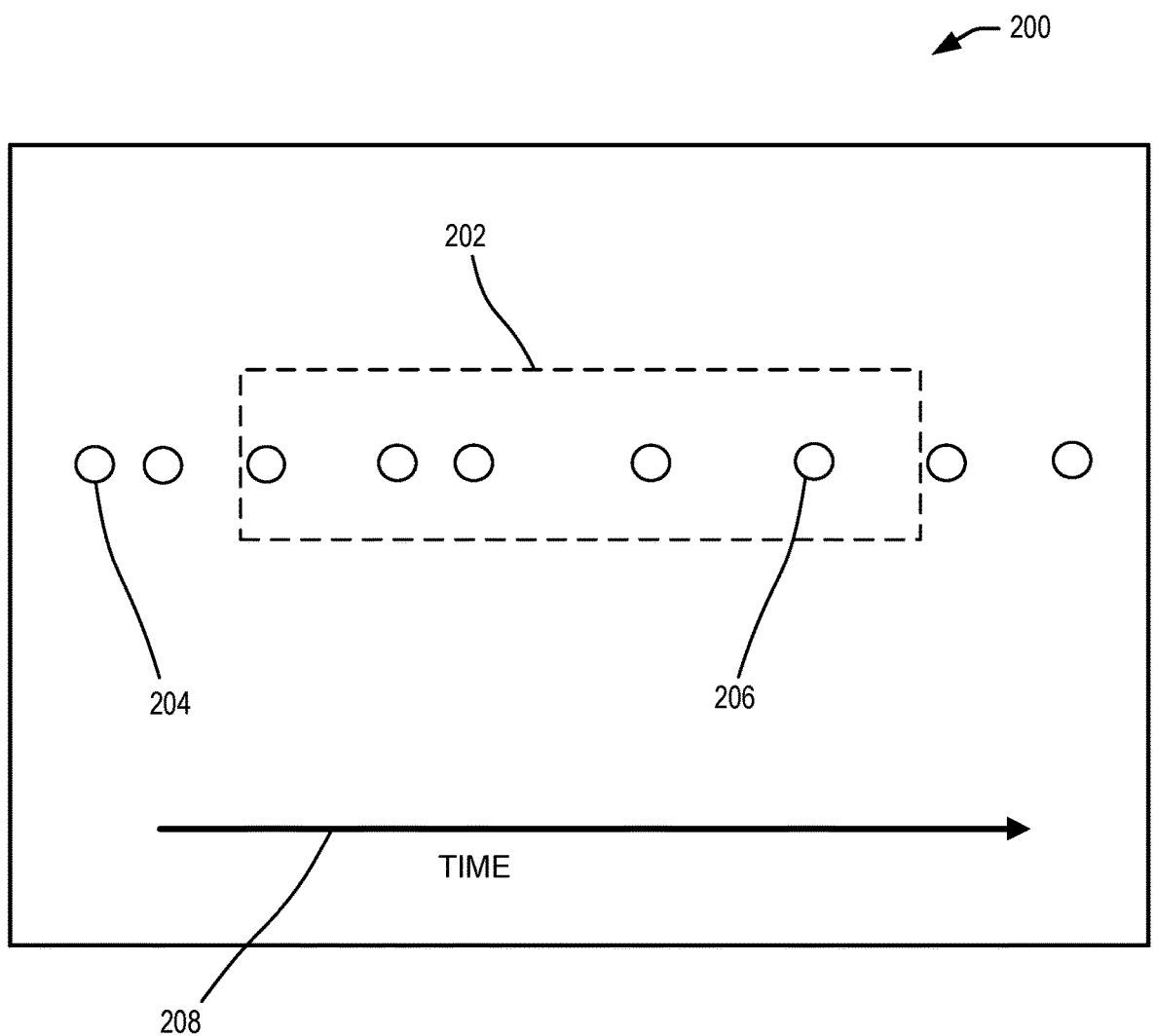
FIG. 2 shows an example temporal relation involving a stateful operator applied to a continuous event stream.

FIG. 2 schematically illustrates an example temporal relation 200 involving a stateful operator, represented schematically by a time window 202, applied to events, represented as event 204 and event 206, of a continuous event stream. In this example, the temporal relation involves a time window operator applied to events 204 and 206 of the stream. In a typical continuous stream, each event can include a timestamp, which can be used to compute temporal relations on the stream. At a time t, the output temporal relation contains all events which are currently present in a time window 202.

In the example of FIG. 2, the events are shown arranged along time axis 208 according to their timestamps. In this example, event 204 precedes time window 202, and therefore is filtered out by the temporal relation. By contrast, the timestamp of event 206 is within time window 202, and therefore event 206 can be allowed to pass through the temporal relation.

Computation of the time window operator requires timestamp information, in order for the window operator to filter out events outside time window 202, e.g., by expiring older records such as event 204. In a typical example, the time window operator can use the events' timestamp values to perform the window operation. Alternatively, the time window operator can use processing time, i.e., time measured by a machine that processes the event, for the event timestamps. The time window operator typically compares such event timestamps to a current system time t, and hence is a continuous stateful operator, which takes an event stream as input, and outputs a temporal relation.

As described above, the amount of data received via the event stream may be quite large, and therefore computing a CQL query such as a temporal relation may require significant computing power. In order to perform a CQL query in a cluster environment and to leverage computational resources of the cluster, it is desirable to distribute the temporal relation or time window computation across cluster nodes. The disclosed system and methods can improve over existing systems by leveraging such distributed computing resources in the computation of a stateful continuous query operator, such as a time window operator.

Scaling Out Time Windows with a Heartbeat Propagator

As described in the example of FIG. 2, a time window operator is a stateful operator requiring a comparison of a system state, i.e. the current time t, to event timestamps. Still, the disclosed system and methods can be used to partition a time window operator's state, and to compute each partition in parallel.

TABLE 1

Single-Partition Time Window
(Size = 3 second)

| Input Event | Window Contents |
| --- | --- |
| t = 1000 Event = {"c1":"val1", "c2":"1"} | {(val1,1)} |
| t = 2000 Event = {"c1":"val2", "c2":"2"} | {(val1,1), (val2,2)} |
| t = 3000 Event = {"c1":"val3", "c2":"3"} | {(val1,1), (val2,2), (val2,3)} |
| t = 4000 Event = {"c1":"val4", "c2":"4"} | {(val2,2), (val3,3), (val4,4)} |

Partitioned Time Window (Size = 3 Seconds)

| Partition-1 | | Partition-2 | |
| --- | --- | --- | --- |
| Input Event | Window Contents | Input Event | Window Contents |
| t = 1000 Event = {"c1":"val1", "c2":"1"} | {(val1,1)} | | |
| | | t = 2000 Event = {"c1":"val2", "c2":"2"} | {(val2,2)} |
| t = 3000 Event = {"c1":"val3", "c2":"3"} | {(val1,1),(val3,3)} | | |
| | {(val3,3)} | t = 4000 Event = {"c1":"val4", "c2":"4"} | {(val2,2), (val3,3), (val4,4)} |

Figure 3:
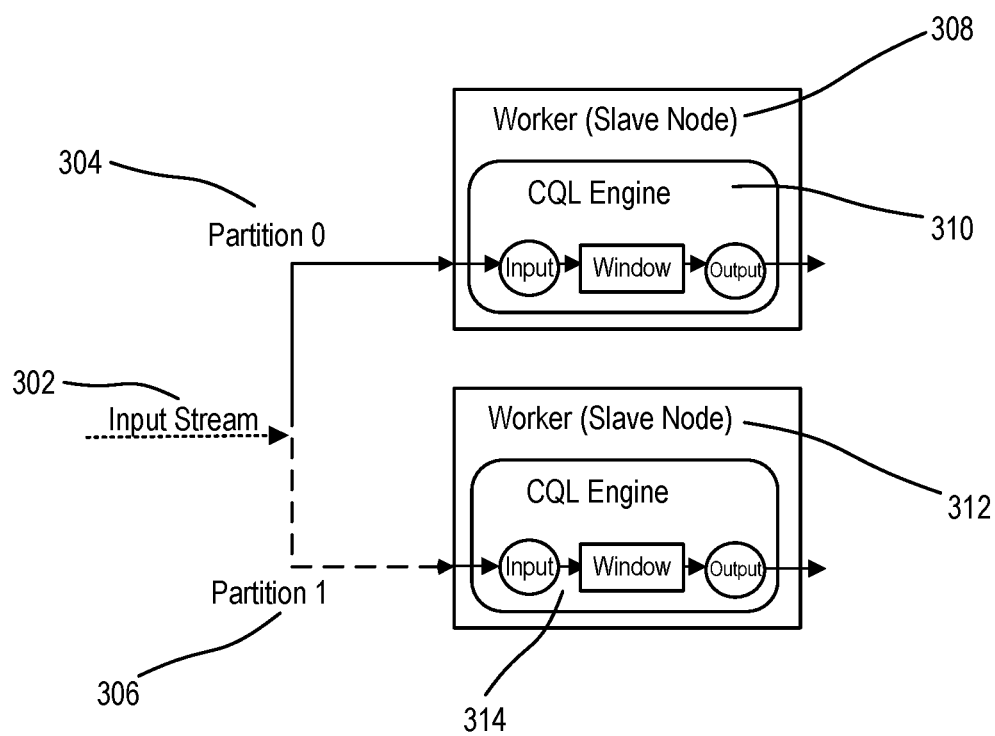
FIG. 3 illustrates an example partitioned event stream, in accordance with an embodiment of the present disclosure.

Table 1 shows an example partitioned time window operation over a continuous stream, according to embodiments. In this example, a single-partition time window of size 3 seconds filters out events as they expire. For example, a first event, occurring at time 1000 milliseconds, is filtered out of the time window output at time t=4000 milliseconds. A partitioned time window operator utilizes a partitioned stream, with the events distributed to two worker nodes. Each node then computes a portion of the time window results by filtering the events distributed to it, as shown in the table. The results can subsequently be combined to obtain the same total time window output as the single-partition operator. To achieve these parallel semantics, the following steps are provided:

Step 1: Partition the incoming stream and deploy a continuous query plan, including a time window operator, to all cluster nodes. FIG. 3 illustrates an example continuous input stream 302 partitioned into multiple partitions, in accordance with an embodiment of the present disclosure. In this example, continuous input stream 302 is divided into two partitions, partition 304 and partition 306, which are labeled "partition 0" and "partition 1," respectively. The two partitions are sent to two worker nodes (in the case of a Spark cluster) or slave nodes, node 308 and node 312, e.g., in a distributed computing cluster. The input stream can be partitioned by a load-balancing function or by any load-balancing mechanism on the ingestion layer, i.e. at the time the stream events are imported and processed. To compute a time window, there is no need to partition the stream for particular criteria. In some embodiments, the input stream can be partitioned by a partitioning function based at least in part on one or more partitioning criteria (for example, range, list, composite, round-robin, or hash partitioning) or attributes, and is not limited by the present disclosure.

Each worker node in the cluster can run an instance of the CQL engine. In this example, node 308 runs CQL engine instance 310, and node 312 runs CQL engine instance 314. In a typical example, the number of partitions can be equal to the number of CQL engine instances. Alternatively, if there are more partitions than CQL engines, one or more of the CQL engines can be mapped to multiple partitions.

Each CQL engine instance receives its respective partitioned input, and can compute and output a stateful temporal relation, such as a time window operator, for a continuous query on the input stream. Subsequently, the respective outputs of the CQL engine instances can be combined into a single overall result. In an embodiment, the union of the respective output relations can equal or substantially equal the output relation computed in serial from an unpartitioned stream.

When deploying an application to the cluster, the master node can parse the CQL query and/or perform semantic and syntax evaluation of the CQL query, and send a request to register the query on each worker node. A respective worker node can process the request to register the query, and subsequently create a query plan and related metadata in the respective worker node's CQL engine instance. After creating the query plan, the respective worker node can begin implementing the continuous query.

Step 2: Next, the system can ensure that all distributed continuous window operators are synchronized by synchronizing the timestamps across partitions. Accurate timestamp information is can ensure that each node can correctly compare event timestamps to the current time window, and expire old events from the window. Thus, in order to compute the moving time window accurately in parallel, all instances of the CQL engine running on the cluster nodes should receive accurate timestamp information.

In an embodiment, the timestamp information can be propagated by either regular or heartbeat events. In an embodiment, a heartbeat event can be a signal sent among various nodes in the cluster to mark time. The heartbeat event can be communicated by shuffling, in the case of an Apache Spark cluster, replicating, and/or broadcasting. In particular, shuffling can involve repartitioning (i.e., distributing the heartbeat event across partitions, including to separate computing nodes). Replicating can involve copying the heartbeat event from a first partition to different partitions, and broadcasting can involve caching a copy of the heartbeat event, which may be read-only data, locally on the computing nodes. In order to synchronize the timestamp, the system can add an intermediate heartbeat propagator component to a respective worker node. This heartbeat propagator component can ensure that each CQL engine instance receives the heartbeat for silent partitions, so the CQL engine instance can accurately compute time window operations.

Execution Model

Figure 4:
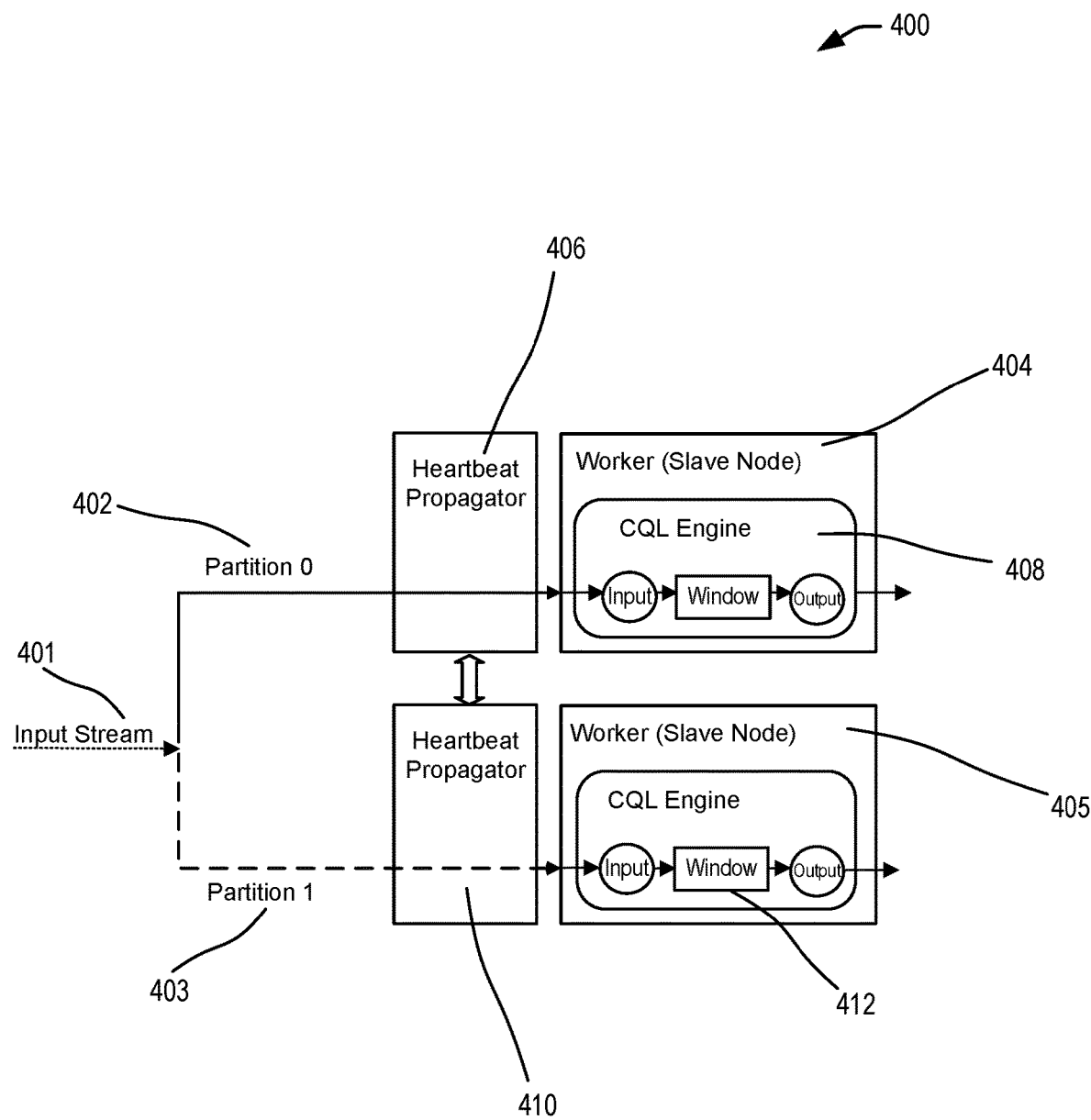
FIG. 4 illustrates an example partitioned event stream with heartbeat propagator components, in accordance with an embodiment of the present disclosure.

FIG. 4 illustrates an example partitioned event stream with heartbeat propagator components, in accordance with an embodiment of the present disclosure. In this example, the continuous input stream 401 is divided into two partitions, partition 402 and partition 403, which are sent to two worker nodes (in the case of a Spark cluster) or slave nodes, node 404 and node 405, similar to the example of FIG. 3. In this example, the heartbeat propagator component 406 is situated prior to CQL engine 408 running on node 404, while heartbeat propagator component 410 is situated prior to CQL engine 412 running on node 405. Thus, every event in propagator for partition 2 can produce a heartbeat event at t=1000 ms, while the heartbeat propagator for partition 1 can produce a heartbeat event at t=2000 ms, as shown in Table 2.

These heartbeat events enable the cluster worker nodes to maintain an accurate value of a stateful operator's state—in this example, the accurate time corresponding to a time window operator—even at times when the nodes' respective partitions are empty. Accordingly, the worker nodes can compute the accurate output of the stateful operator, based on the state, for their respective partitions. In particular, load balancing need not be perfect, as each worker node receives an accurate representation of the times at which to compute the time window, and therefore each partition produces output for the same timestamp sequence.

TABLE 2

Partitioned Time Window (Size = 3 Seconds)

| Partition-1 | | | Partition-2 | | |
|---|---|---|---|---|---|
| Input Event | Output from Heartbeat Propagator | Window Contents | Input Event | Output From Heartbeat Propagator | Window Contents |
| t = 1000 Event = {"c1":"val1", "c2":1"} | t = 1000 Event = {"c1":"val1", "c2":1"} | {(val1,1)} | | Heartbeat 1000 | |
| | Heartbeat 2000 | {(val1,1)} | t = 2000 Event = {"c1":"val2", "c2":2"} | t = 2000 Event = {"c1":"val2", "c2":2"} | {(val2,2)} |
| t = 3000 Event = {"c1":"val3", "c2":3"} | t = 3000 Event = {"c1":"val3", "c2":3"} | {(val1,1),(val3,3)} | | Heartbeat 3000 | {(val2,2)} |
| | Heartbeat 4000 | {(val3,3)} | t = 4000 Event = {"c1":"val4", "c2":4"} | t = 4000 Event = {"c1":"val4", "c2":4"} | {(val2,2), (val3,3), (val4,4)} | the two partitions of the stream can pass through a respective heartbeat propagator component before being processed by the respective CQL engines. Accordingly, the respective CQL engines can receive the stream partitions processed by the respective heartbeat propagator components, and including any heartbeat signals.

The heartbeat propagator can ensure that for each partition of the stream (regardless of whether the partition is empty or contains events at a particular time), the corresponding CQL engine instance receives at least one event, thereby resulting in timestamp progression.

For example, suppose heartbeat propagator 406 receives a partition that is empty, i.e. without timestamped events, at a time t. However, at the same time t, another partition of the stream, corresponding to heartbeat propagator 410, contains a timestamped event. Heartbeat propagator 406 can then propagate a heartbeat event, including a timestamp at time t, to CQL engine 408, so that CQL engine 408 can compute the time window operator. As described above, a heartbeat event can be a signal with the primary purpose of marking time, such as an "empty" (i.e., "silent") event including a timestamp.

Table 2 shows how the example of Table 1 will be modified when heartbeat propagator components are included in the system, according to embodiments of the present disclosure. In this example, partition 1 contains an event at time t=1000 milliseconds, while partition 2 is empty at the corresponding time. At time t=2000 milliseconds, the situation reverses itself: partition 1 is empty, while partition 2 contains a timestamped event. Accordingly, the heartbeat Scalability Metrics The scalability of a parallel process is frequently measured based on its latency and throughput. In some embodiments of the disclosed system, the CQL engines can process stream events organized into batches or micro-batches, rather than individually. For example, a streaming analytics engine such as Apache Spark Streaming may be used that ingests, or parses, stream data in batches or micro-batches having discrete durations. In such cases, it may be difficult to measure latency or throughput because the discrete time scale of the batches may limit the system's ability to reduce latency. That is, the end-to-end latency may be governed by the duration of the batches, while throughput for each batch may be governed by the input ratio.

Instead, the system can measure the processing time of the respective batches. In particular, the input stream should be well partitioned (i.e., the number of partitions should be large enough and the data evenly distributed among partitions). The partitions should be processed in parallel with different tasks. There should be more than one iteration for each partition (if the number of partitions is not too large). With these assumptions, adding an executor along with a CQLEngine will reduce the processing time for each batch.

Spark Streaming provides web-accessible metrics of each job and task, with the following metrics:

Duration, Scheduler Delay, Task Serialization Time, GC Time, Result Serialization Time, Getting Result Time, Peak Execution Memory Event Viewer for each task (e.g., the Spark Event Viewer web interface, which can be accessed at http://<driver-node>:4040). For example, the system can determine how the partitions get processed by executors.

Figure 5:
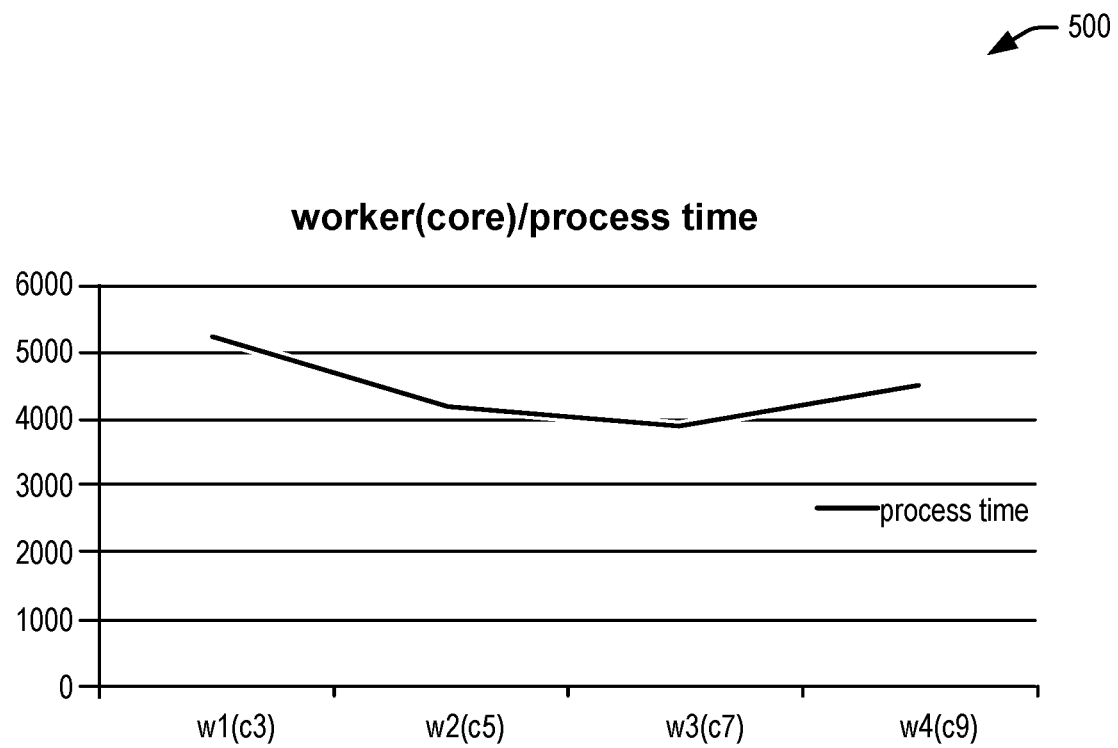
FIG. 5 illustrates processing time per worker core for a distributed continuous query operation, in accordance with an embodiment of the present disclosure.

In addition to the metrics from Spark Streaming, the system can also add the following logs based on calls to SparkCQL code:
  Collect metrics for each batch when processing of a batch of jobs has completed (e.g., upon a call to CQLStreamingListener.onBatchCompleted)
    processTime, throughput, scheduling delay
  Collect metrics for each CQL Resilient Distributed Dataset (CQLRDD)
    totalTime, getCQLEngineTime, getTuplesTime, RPCMode, processTime, snapshotTime, resultLength In various embodiments, the system can make use of the following techniques to measure scalability/performance:
  1. Fix hardware resource(maximum number of workers in a cluster with maximum hw resource) and change load (1 k events/sec, 10 k/sec, 100 k/sec, 1 m/sec, . . . )
    This will show how the engine performs and give some idea about the limitation (scheduling delay or memory overflow, . . . )
  2. Fix the load (maximum load that does not affect the scheduling) and change the hardware resources (1 worker, 2 worker, 4 worker, . . . )
    This will show how the system behaves with additional resources
  3. Change the hardware resources and change load
    This is mix of above Methodology To verify the theory above, the system can implement the following steps:
  Fixed Input without external component affecting the whole system's performance
    The system can test using a load generator for discretized streams (e.g., LoadgenDStream), which creates fixed records for each batch
      The input is a comma-separated value (csv) file
  Simple output that does not affect any system's performance
    result.foreachRDD {rdd=>rdd.foreachPartition {records=>println(_.length)}}
  Simulate increasing worker with the followings on the Spark Standalone Cluster with local workers
    1 Worker(3 Core)—cores for Driver, CQLEngine, Resilient Distributed Dataset (RDD)
    2 Worker(5 Core)—add Worker with two cores (CQLEngine, RDD)
    3 Worker(7 Core)—add Worker with two cores (CQLEngine, RDD)
    The system cannot run 4 Worker(9 Core) with a host that has less than 5 CPUs (or 10 VCores)
      This was one of the reason why the performance gets bad with 4 worker scenario
  Steps using aliases:
  1. Start Master
    1. master
  2. Add a worker with three cores (default)
    1. slave1
  3. Run a loadgen Filter example with a single CQLEngine
    1. loadgenFilter_cluster1
    2. killDriverAfter 10 m
    3. collect metrics and copy logs
  4. Add a worker with two cores
    1. export PERF_NO_CORES_PER_EXECUTOR=2; slave2
  5. Run a loadgen Filter example with two CQLEngines
    1. loadgenFilter_cluster2
    2. killDriverAfter 10 m
    3. collect metrics and copy logs
  6. Add a worker with two cores
    1. export PERF_NO_CORES_PER_EXECUTOR=2; slave3
  7. Run a loadgen Filter example with three CQLEngines
    1. loadgenFilter_cluster3
    2. killDriverAfter 10 m
    3. collect metrics and copy logs
  8. Add a worker with two cores
    1. export PERF_NO_CORES_PER_EXECUTOR=2; slave4
  9. Run a loadgen Filter example with four CQLEngines
    1. loadgenFilter_cluster4
    2. killDriverAfter 10 m
    3. collect metrics and copy logs Preliminary Result FIG. 5 illustrates processing time per worker core for a distributed continuous query operation, in accordance with an embodiment of the present disclosure. As illustrated, the system can reduce the processing time of a batch, or the processing time per worker node, by parallel scaling over additional processing nodes. Accordingly, the disclosed system and methods facilitate the parallelization of a temporal relation with a stateful operator, such as a timestamp, and thereby improve on previous systems by enabling more efficient computations of temporal relations in parallel.

Automatic Time Progression Using Heartbeat Events for Distributed Application-Time Stamped Systems Embodiments of the present disclosure can further provide techniques for using heartbeat events to implement automatic time progression for distributed application-time-stamped systems. In particular, stream events can be ingested in batches or micro-batches. Accordingly, the disclosed system and methods can use the highest application timestamp from a previous micro-batch to advance the time of the application.

In event-timestamped streams, the timestamp of each event of the stream is assigned from one of the event's attributes. For example, consider a call data stream for a call center, defined as:

CREATE STREAM CALL_CENTER(call_time timestamp, call_id long, status char(100))

In this stream definition, if a user marks the timestamp field as "call time," then the stream will be event-timestamped. Otherwise, the system will assign the timestamp based on the actual time during processing, and the stream will be referred to as a processing-timestamped stream.

For distributed continuous queries on event-timestamped streams, one instance of the query plan can run on each cluster node. Each query plan can receive one or more partitions of the stream data, and process the events belonging to its respective one or more partitions only.

To compute a distributed stateful continuous operator, all instances of the operator running on various cluster nodes should be synchronized to perform temporal operations. For example, to compute a distributed moving time window such as in the example of FIG. 2, all instances of the time window operator require accurate timestamp information, in order to ensure that events present in the windows are valid and old events are expired from window.

Figure Distributed Query Plan Running in a Cluster

As described in the examples of FIGS. 2 and 4, the time window is a stateful continuous operator which requires synchronization of the state, or timestamp, across nodes. In a typical example, the event timestamps are always in non-decreasing order. That is, the value of the timestamp attribute in an incoming payload (or event) is always the same or higher than the previous event's timestamp attribute value. Furthermore, stream data may typically arrive in batches or micro-batches, and each batch is uniquely identified by its batch-time. That is, the stream data can be parsed in groups or batches, which can have discrete durations, rather than each event being processed as soon as it is available.

Figure 6:
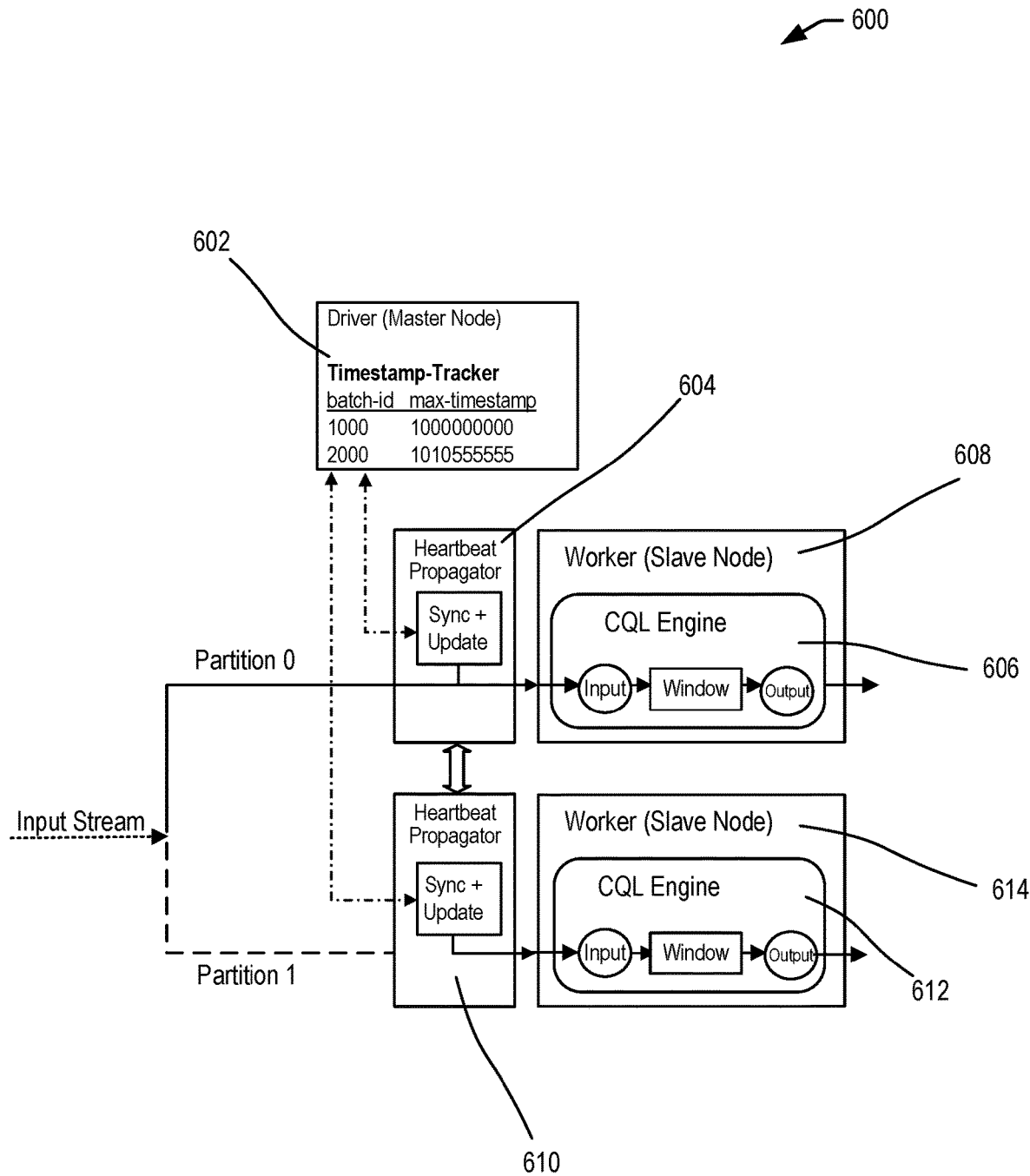
FIG. 6 illustrates an example partitioned event stream with heartbeat propagator components and a timestamp tracker, in accordance with an embodiment of the present disclosure.

In an embodiment, the system can solve the problem of advancing the application time by making use of timestamp tracker and heartbeat propagator components. FIG. 6 illustrates an example partitioned event stream with heartbeat propagator components and a timestamp tracker, in accordance with an embodiment of the present disclosure.

In this example, timestamp tracker 602 runs on a master node (or Spark Driver in the case of an Apache Spark cluster) of the parallel job. Timestamp tracker 602 maintains a registry of the maximum observed timestamp for each batch.

Similar to the example of FIG. 4, a heartbeat propagator component can run on each worker (in the case of a Spark cluster) or slave node. The heartbeat propagator can be located intermediate between the stream and the node's respective CQL engine, and can communicate directly with timestamp tracker 602. In this example, heartbeat propagator component 604 is located prior to CQL engine 606 running on worker node 608, while heartbeat propagator component 610 is located prior to CQL engine 612 running on worker node 614. Rather than a respective CQL engine listening directly to the partitioned stream, the heartbeat propagator and timestamp tracker can ensure that after every batch, the respective CQL engine receives a heartbeat event having timestamp equal to the maximum timestamp across all partitions.

For example, for each batch, timestamp tracker 602 can receive the highest timestamp values (i.e., those with the latest times) from worker nodes 608 and 614 for their respective partitions, and choose the highest timestamp value across all partitions. Then each heartbeat propagator, for example heartbeat propagator 604 on worker node 608, can synchronize with timestamp tracker 602 to obtain the previous batch's highest timestamp. Before propagating the current batch of events to CQL engine 606, heartbeat propagator 604 can propagate a heartbeat with this maximum-timestamp value.

In this example, after propagating all events from current batch, heartbeat propagator 604 can update the timestamp tracker registry with the current batch's highest timestamp. Each heartbeat propagator component (e.g., heartbeat propagator 604 and heartbeat propagator 610) can communicate the highest timestamp for its respective partition to timestamp tracker 602, and timestamp tracker 602 can then register the maximum timestamp across all partitions for the batch.

In an embodiment, the disclosed system and methods are not limited to propagating the latest timestamps, and can use any method to synchronize timestamps within a batch. For example, the timestamp tracker and/or heartbeat propagator can propagate an observed timestamp other than the latest one, such as a typical or earliest timestamp. In an embodiment, the system can propagate a descriptive statistic such as a mean, median, or mode of the observed timestamps in the batch, and is not limited by the present disclosure.

Table 3 shows an example partitioned time window operation utilizing heartbeat propagators and a timestamp tracker, according to embodiments of the present disclosure. In this example, a continuous event stream with timestamps ranging between 100 s (100,000 ms) and 350 s is distributed into two partitions and broken into two batches. None of the events are simultaneous over both partitions (i.e., the partitions do not contain any of the same timestamps). In this example, the stream is opened at 100 s, thus batch 1 is the first batch. As a result, during batch 1, neither partition contains a heartbeat event, and the heartbeat propagator output matches the input for each partition.

TABLE 3

| | BATCH-1 Input Events (call_time, call_id, status) | BATCH-1 Heartbeat Propagator Output (call_time, call_id, status) | BATCH-2 Input Events (call_time, call_id, status) | BATCH-2 Heartbeat Propagator Output (call_time, call_id, status) |
|---|---|---|---|---|
| Partition 0 | 100000, 1, OPEN 150000, 2, PROCESSING 180000, 3, CLOSED 200000, 4, OPEN | 100000, 1, OPEN 150000, 2, PROCESSING 180000, 3, CLOSED 200000, 4, OPEN | 300000, 1, OPEN 350000, 2, PROCESSING | Heartbeat 200000 300000, 1, OPEN 350000, 2, PROCESSING |
| Partition 1 | 120000, 5, OPEN 155000, 6, PROCESSING 190000, 7, CLOSED | 120000, 5, OPEN 155000, 6, PROCESSING 190000, 7, CLOSED | | Heartbeat 200000 |

As in the example of FIG. 6, the timestamp tracker component can receive the maximum event timestamp for each partition for the previous batch, and then output the globally maximum timestamp to the heartbeat propagators at the start of the next batch. As shown in Table 3, the maximum timestamp in batch 1 is 200 s, which belongs to the event in partition 0 with call_id=4. Therefore, in batch 2, the respective heartbeat propagators for both partitions output a heartbeat event with a timestamp of 200 s. For both partitions, this forms the first event in the batch. For partition 0, there are also two events, so the heartbeat propagator output contains the heartbeat event followed by two events. For partition 1, batch 2 is empty, so the heartbeat propagator output contains only the heartbeat event. Thus, the heartbeat propagators and timestamp tracker disclosed herein can enable the CQL engines to compute a stateful continuous query operator, using synchronized timestamps in each partition appropriate to the batch.

Overview of Timestamps in SparkCQL

SparkCQL supports two types of timestamps: the processing timestamp and event timestamp. Event time refers to the time that an event actually occurred, typically measured by a timestamp attached to the data record that the event emits. In virtually all data streams, the events carry timestamps that define when the event was created: for example, Web server logs, events from monitoring agents, mobile application logs, environmental sensor data, etc. Processing time refers to the time measured by a machine that processes the event. Processing time can simply be measured by the clock of the machines that run the stream processing application.

The processing timestamp can be assigned from the procedure to create a new tuple (i.e., record) from the wall clock (e.g., using a call to System.currentTimeMillis). This timestamp is called a "processing timestamp" because the tuple creation procedure (e.g., createTuple) is invoked through so-called "lazy evaluation" from CQLRDD processing, and therefore the timestamp reflects the time of the call. For example:

rows.map(v=>eventType.createTuple(v))
    .cql("select*from inputs")
    MappedDStream←CQLDStream The event timestamp is obtained from a column specified by the user.

Internally, SparkCQL only uses 'application timestamp' from CQLEngine both for streams and relations.

Timestamps in SX UI

By default in the UI, the timestamp is hidden from the user by using the processing timestamp in SparkCQL. When a user selects "Event Time" for the stream, the system can prompt the user to select a field from the Event Type, or select Apache Kafka time.

From the UI perspective in Oracle Stream Explorer (SX), there are three types of timestamp: default timestamp, event timestamp, and Kafka Timestamp. When the user does not specify any timestamp column, the default timestamp used is the processing timestamp. When the user specifies a column, the system uses the event timestamp. Finally, the system can obtain a timestamp from Apache Kafka, which can be either LogAppendTime or CreateTime. Kafka time can be treated as the event time, which may be preferable to the user, rather than picking a field from the event.

Timestamps in CQLEngine

The system can use the application timestamp in SparkCQL. For reference, with the system timestamp, CQLEngine assigns the timestamp at the ingestion time. In an embodiment, the system may not use the system timestamp at all with SparkCQL, because of the issue of timestamp synchronization in the distributed environment. For the application timestamp, the CQLEngine can use the timestamp in the TupleValue (i.e., do nothing). The system can always use this in SparkCQL. For the derived timestamp, the CQLEngine picks up the timestamp from the specified event column or expression. This is a special form of application timestamp. This is easy to support from SparkCQL but in some embodiments, the system may not support this in order to simplify the UI.

Timestamp Progression and Heartbeat Generation

All operators in CQLEngine use non-blocking/incremental computation and require timestamp progression in order to be non-blocking. CQLEngine can use an internal thread to generate hearbeats in case the 'system timestamp' is used. However, CQLEngine does not generate any heartbeats internally if the 'application timestamp' is used.

The typical problem from lack of heartbeat with 'application timestamp' is in three categories: delayed output; no expiration from windows; or no duration fire from pattern matching such as missing event.

Processing Timestamp Heartbeat Generation

A key point is that the system should use the 'batchTime' as the starting time of events created for the batch (by Event.createTuple through the lazy evaluation). All the timestamps for tuples created from a batch should be in the range (currentBatchTime+batchDuration−2); the heartbeat appended to tuples is (currentBatchTime+batchDuration−1) (i.e., the end-of-batch time). CQLRDD has the 'time' field set from CQLDStream, which is the batch time. The system must make the batch time available to EventType.createTuple, as this is the function body of MapDStream. In order to do so, in some embodiments, the system may leverage the fact that CQLRDD and EventType.createTuple should be invoked from the same thread because they should be in the same lineage and use Thread Local Storage to pass information from CQLRDD to createTuple. In some embodiments, the system can create the tuple after repartitioning. Otherwise CQLRDD and createTuple would be in the different stage and this assumption about running from the same thread would fail. For example:

rows.map (v→(v(2), eventType.createTuple(v))
    .transform (rdd=>rdd.partitionBy(new OrderPartitioner
        (numPartitions))
    .map {case (k, v)=>v}
    ===>
    rows.map (v→(v(2), v))
    .transform (rdd=>rdd.partitionBy(new OrderPartitioner
        (numPartitions))
    .map case (k, v)=>eventType.createTuple(v)

For simplicity, this example makes use of a sequence.

One potential disadvantage of this approach is that the timestamp is the processing time, and not the ingestion time. That is, the timestamp is assigned from the actual processing and not from the time the event is ingested with the receiver; however, most users would expect the ingestion time. If the batch jobs run without any backlogs, the timestamp should be similar and therefore acceptable, but if there are many backlogs, then it could be significantly different and the actual behavior of window/missing event could be different. In an embodiment, the system can use the ingestion time, but then the original question about which timestamp to insert in the heartbeat must be resolved.

In another approach, the system can use a special transformation in the ingestion step. For example:

val converter=(v: String)=>eventType.createTuple(v.split
        (","))
    rows.toTupleStream(ChannelDesc(table,  eventType,
        overrideTimestamp=true), converter)

This approach may be cleaner, and more explicit regarding the processing timestamp generation. Additionally, the system can handle the processing timestamp as a special case of an event timestamp.

Timestamp Distribution

Timestamps for the events in the batch are distributed in the range of (currentBatchTime, currentBatchTime+batchDuration−1).

There are several possible solutions for the method of distribution. First, the system can use a wall clock time difference. If the system uses the actual wall clock time (e.g use the difference of currentTimeMills to the base) to incorporate the ingestion delay, there could be complications because the timestamp could overflow the batch duration. One solution is to cap the difference up to some time (e.g., ½ or ⅔ of batch duration) and use sequences after the cap. Or the system could use the TupleValue's time as nanotime as well.

Alternatively, the system can use evenly distributed time. For each micro batch, the system can obtain the number of events in the batch to distribute time evenly. I.e., the system can use an interval=(batch duration/number of events) in between the timestamps.

In another embodiment, the system can use evenly distributed time controlled by the user. The system can use 'maxRate' to get the base resolution to distribute events. The base interval would be (batchDuration/maxRate). In various embodiments, the system can create a new configuration for 'maxRate,' or can use the existing configuration. There are two maxRate configurations that the system can use: 'spark.streaming.receiver.maxRate' and 'spark.streaming.kafka.maxRatePerPartition.' In order to prevent overflowing to the next batch, the system can switch to nano resolution once it reaches the end of the batch (i.e., maxRate−1).

The method works as follows:

```
baseInterval = batchDuration/maxRate
for (seq <- 0 until events.size)
    if (seq < maxRate)
        timestamp = (currentBatchTime + (seq * baseInterval) ) << 3
    else
        timestamp = (currentBatchTime + (maxRate - 1) *
        baseInterval ) << 3 + (maxRate - seq)
```

Figure 7:
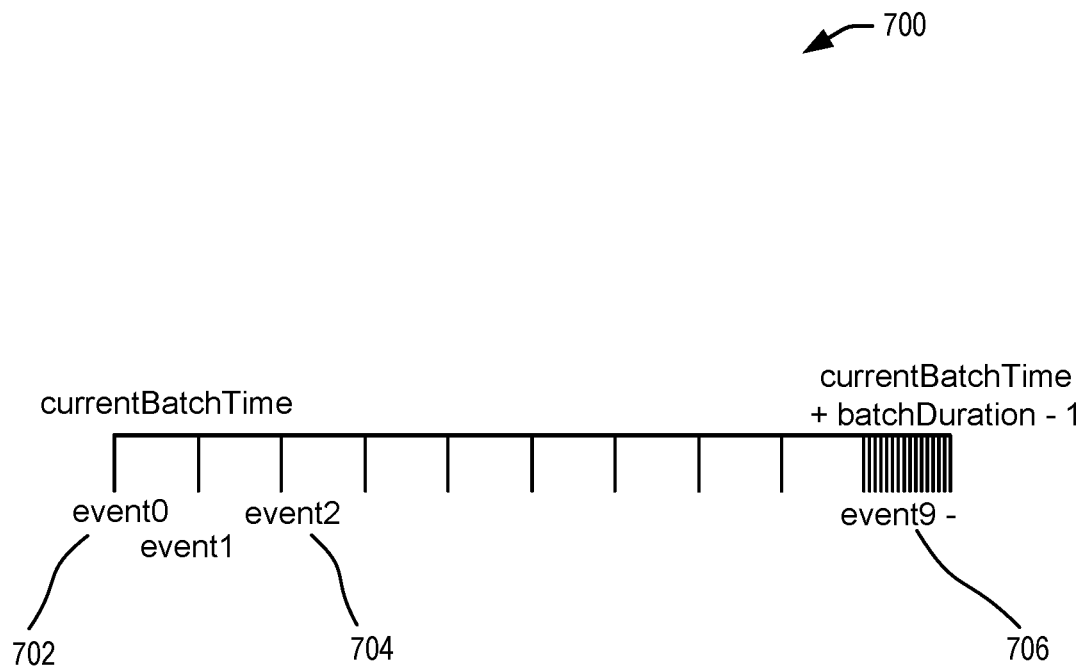
FIG. 7 illustrates timestamp distribution using evenly distributed time controlled by a user, in accordance with an embodiment of the present disclosure.

FIG. 7 illustrates timestamp distribution using evenly distributed time controlled by a user, in accordance with an embodiment of the present disclosure. In this example, the initial events, such as events 702 and 704, can be spaced uniformly by baseInterval. After a predetermined number maxRate of events, the system can distribute the event timestamps, such as for event 706, with nano resolution.

Finally, the system could just use a simple sequence instead of base interval for evenly distributed time. This approach is particularly simple.

Repartition of Heartbeat Events

Kafka→Filter→Group By

In this scenario, assume the system assigns timestamps only in the first stage, and relies on the TupleValue.getTime for timestamp for second stage and onwards. Even if the system enables the query to emit the heartbeat events in the first stage, it is still necessary to repartition the stream before the second stage.

It is necessary to repartition the heartbeat event, which is an empty tuple with heartbeat flag. In an embodiment, the system can handle partitioning heartbeats for Groupby-Groupby case.

p1(ab) a11-b12-h13 c10 a11 b12 d13 h13 h14 p1(ac) c10 a11 h14 p2(cd) c10-d13-h14 p2(bd) b12 d13 h14

One option would be to put the latest heartbeat to each partition when the system handles timestamp ordering.

Another approach is leveraging the partitioner and handles heartbeats from repartitioning using 'reverse partition.' The reverse partition is the step to assign partition criteria attributes into heartbeats, so that it can be used in the next partition.

The repartition code looks like this:

```
def repartition(parent:DStream[TupleValue], eventType:EventType,
oldPartitioner:TuplePartitioner, newPartitioner:TuplePartitioner):
DStream[TupleValue] = {
    this.heartbeatReversePartition(parent, eventType, oldPartitioner,
        newPartitioner)
            .tupleToPair(newPartitioner.keyIndex)
```

```
            .transform( rdd => rdd.partiionBy(newPartition))
            .map { case (k,v) => v}
```

TuplePartitioner is extending Spark's partitioner and add 'keyIndex', 'partitionValue' and 'partitionValues'.

Flow and Implementation

The overall flow for the above approach is described below:

Current situation parent.iterator will eventually invoke EventType.createTuple the system can assign a timestamp with System.currentTimeMillis in EventType.createTuple The following uses the third approach to illustrate the basic idea.

```
Flows and changes
Add BatchTimer class
class BatchTimer {
    var sequence:Int = 0
    var baseTime:Long = System.currentTimeMills
    def batchTime(tm:Long) = { batchTime = tm; sequence = 0 }
    def nextTime:Long = { sequence += 1; baseTime + sequence }
}
object BatchTimer {
    val tls = new ThreadLocal[BatchTimer]
    def get = { tls.get }
}
Changes of CQLDStream
    val batchDuration = cqlContext.batchDur_
    set batchDuration CQLRDD
    new CQLRDD(..., batchDuration)
Changes of CQLRDD
    CQLRDD(.... batchDuration:Duration, ...)
    val batchTimer = BatchTimer.get
    batchTimer.batchTime = time
    ...
    val nextBatchTime = time + batchDuration
    create heartbeat with (nextBatchTime - 1)
    add the heartbeat to the tuples before sending the tuples to CQLEngine
Changes of EventType.creaeTuple
    val batchTimer = BatchTimer.get
    val timestamp = batchTimer.nextTime
```

Event Timestamp Heartbeat Generation

If 'Event Timestamp' is used (e.g., the timestamp is given by the user in a column in the event), the system cannot use 'batchTime' for heartbeat for event timestamped case. To illustrate this, consider an example with a range window running on two cqlengines running on two executors. For simplicity, in this example, every batch contains one record.

Query: SELECT*FROM S[RANGE 3]

Input:

1001: 1

1002: 2

1003: 3

1004: 4

1005: 5

Suppose 1001 and 1002 goes to CQL Engine 1 which is processing partition-1. Window of CQL Engine1 will have two records:

{(1001,1),(1002,2)}

Remaining three event goes to CQLEngine 2 which is processing partition-2: Window of CQL Engine 2 will have three records:

{(1003,3),(1004,4),(1005,5)}

In this case of application timestamp, the system may evaluate an empty CQLRDD at Node1 when (1003,3)

arrives because (1003,3) belongs to the partition running on Node2. With the other three inputs, the timestamp is moved to 1005. So preferably, events of the window in CQL Engine1 should expire as window size is 3. To expire these events, CQL Engine1 needs a heartbeat from CQLRDD computation. In various embodiments, the system can make use of different components to propagate the heartbeat of 1003 to CQLEngine1.

Design

1) Insert heartbeat from re-partitioning

The system can insert a heartbeat from a custom partitioner.

1001,1 p1
1002,2 p1
1003.3 p2
1004,4 p2
1005,5 p2
<1005,HT p1>

2) Have CQLEngineTracker tracks the maximum timestamp for each partition

In addition to handling from custom partitioner, for the case when the system does not re-partition, the system can also use CQLEngineTracker to track the latest event time timestamp of a batch.

From CQLRDD, the system sends the snapshot information and can add the latest event time from the partition. The max(largest event time) of batch is return to CQLRDD as part of getCQLEngine request.

Batch 1
1001,1 p1
1002,2 p1
send 1002 to CQLEngineTracker as part of snapshotInfo
1003.3 p2
1004,4 p2
1005,5 p2
send 1005 to CQLEngineTracker as part of snapshotInfo
CQLEngineTracker
largest event timestamp of p1-1002
largest event timestamp of p2-1005
largest event timestamp of batch=1005
Batch2
getCQLEngine(p1) return 1005 since 1002<1005
Heartbeat of (1005) is sent to CQLEngine before input tuples largest event timestamp of p1-1005
In this case, getCQLEngine(p2) does not include heartbeat since 1005=1005.

Illustrative Systems

Figure 8:
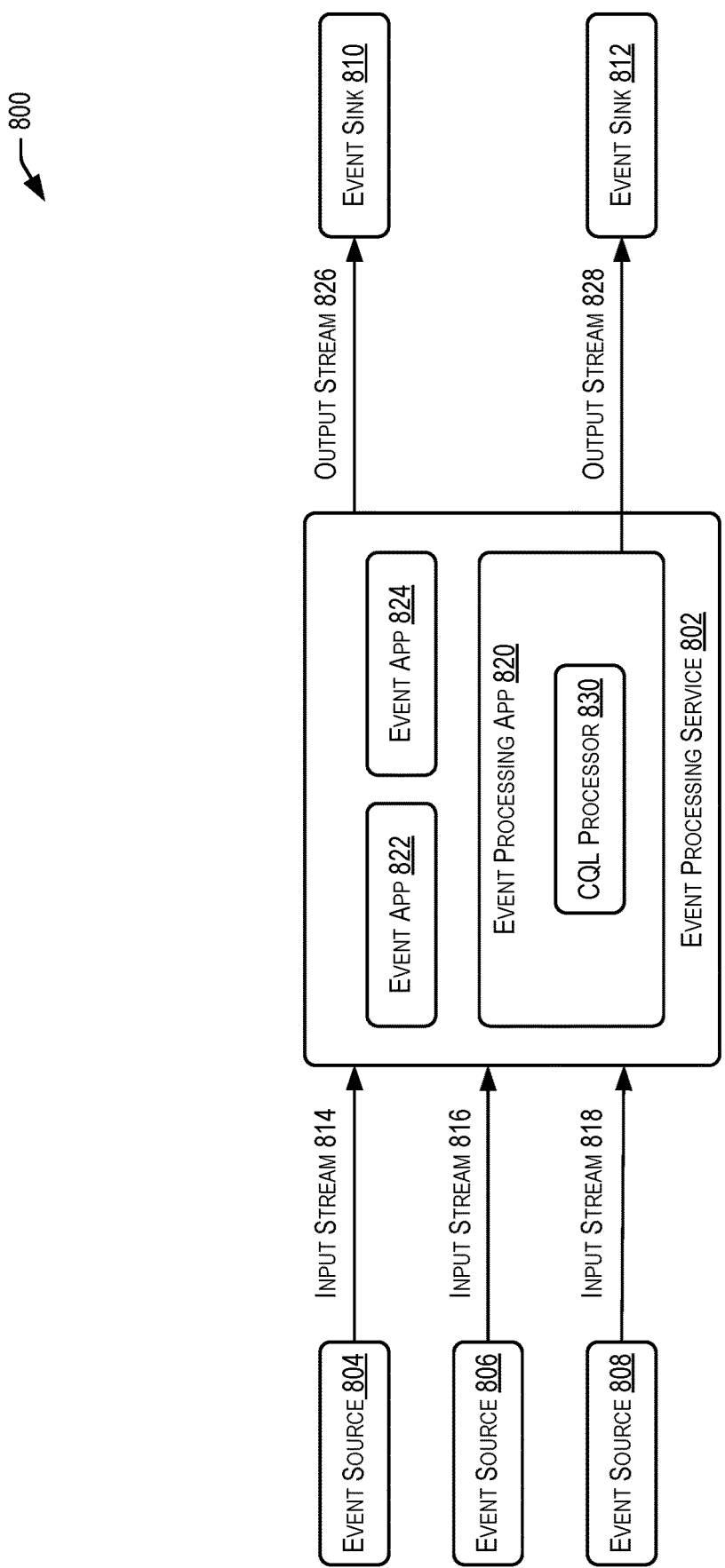
FIG. 8 is an illustration of a simplified high level diagram of an event processing system in accordance with an embodiment of the present disclosure.

FIGS. 8-11 illustrate aspects of example environments for implementing aspects of the present disclosure in accordance with various embodiments. FIG. 8 depicts a simplified high level diagram of an event processing system 800 that may incorporate an embodiment of the present disclosure. Event processing system 800 may comprise one or more event sources (804, 806, 808), an event processing service (EPS) 802 (also referred to as CQ Service 802) that is configured to provide an environment for processing event streams, and one or more event sinks (810, 812). The event sources generate event streams that are received by EPS 802. EPS 802 may receive one or more event streams from one or more event sources. For example, as shown in FIG. 8, EPS 802 receives a first input event stream 814 from event source 804, a second input event stream 816 from event source 806, and a third event stream 818 from event source 808. One or more event processing applications (820, 822, and 824) may be deployed on and be executed by EPS 802. An event processing application executed by EPS 802 may be configured to listen to one or more input event streams, process the events received via the one or more event streams based upon processing logic that selects one or more events from the input event streams as notable events. The notable events may then be sent to one or more event sinks (810, 812) in the form of one or more output event streams. For example, in FIG. 8, EPS 802 outputs a first output event stream 826 to event sink 810, and a second output event stream 828 to event sink 812. In certain embodiments, event sources, event processing applications, and event sinks are decoupled from each other such that one can add or remove any of these components without causing changes to the other components.

In one embodiment, EPS 802 may be implemented as a Java server comprising a lightweight Java application container, such as one based upon Equinox OSGi, with shared services. In some embodiments, EPS 802 may support ultra-high throughput and microsecond latency for processing events, for example, by using JRockit Real Time. EPS 802 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 8 provides a drilldown for one such event processing application 820. As shown in FIG. 8, event processing application 820 is configured to listen to input event stream 818, execute a continuous query 830 comprising logic for selecting one or more notable events from input event stream 818, and output the selected notable events via output event stream 828 to event sink 812. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 820 in FIG. 8 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 802 without having to store all the received events data. Accordingly, EPS 802 provides a special querying mechanism that enables processing of events to be performed as the events are received by EPS 802 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 802 for a particular event stream may be executed each time that an event is received in that event stream. As part of the continuous query execution, EPS 802 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(2) One or more application processors (or event processing agents) are configured to consume normalized event data from a channel, process it using queries to select notable events, and forward (or copy) the selected notable events to an output channel.

(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 800 depicted in FIG. 8 may have other components than those depicted in FIG. 8. Further, the embodiment shown in FIG. 8 is only one example of a system that may incorporate an embodiment of the present disclosure. In some other embodiments, system 800 may have more or fewer components than shown in FIG. 8, may combine two or more components, or may have a different configuration or arrangement of components. System 800 can be of various types including a service provider computer, a personal computer, a portable device (e.g., a mobile telephone or device), a workstation, a network computer, a mainframe, a kiosk, a server, or any other data processing system. In some other embodiments, system 800 may be configured as a distributed system where one or more components of system 800 are distributed across one or more networks in the cloud.

The one or more of the components depicted in FIG. 8 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 9:
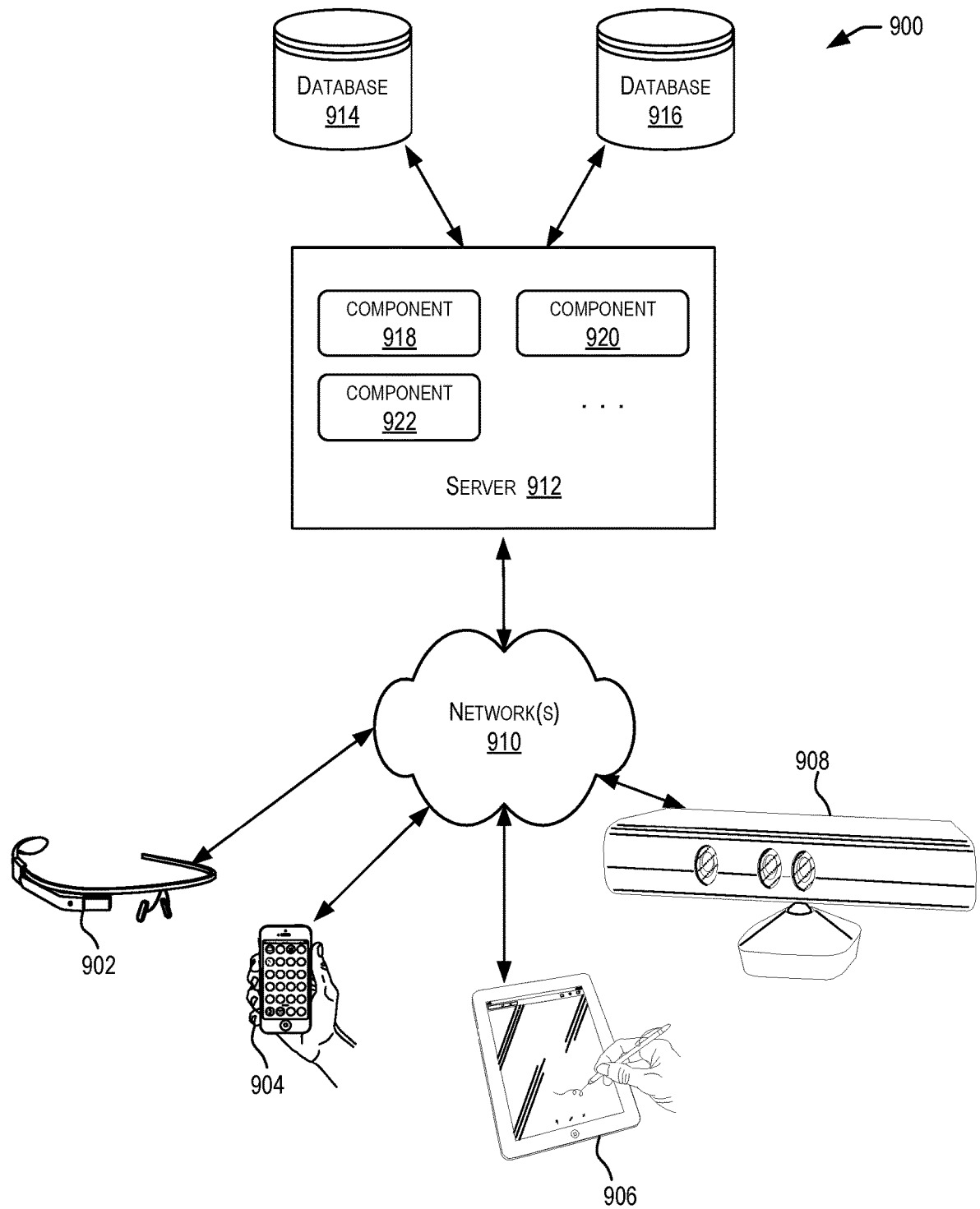
FIG. 9 depicts a simplified diagram of a distributed system for implementing an embodiment of the present disclosure.

FIG. 9 depicts a simplified diagram of a distributed system 900 for implementing an embodiment of the present disclosure. In the illustrated embodiment, the distributed system 900 includes one or more client computing devices 902, 904, 906, and 908, which are configured to execute and operate a client application such as a web browser, proprietary client (e.g., Oracle Forms), or the like over one or more network(s) 910. The server 912 may be communicatively coupled with the remote client computing devices 902, 904, 906, and 908 via network 910.

In various embodiments, the server 912 may be adapted to run one or more services or software applications such as services and applications that provide identity management services. In certain embodiments, the server 912 may also provide other services or software applications can include non-virtual and virtual environments. In some embodiments, these services may be offered as web-based or cloud services or under a Software as a Service (SaaS) model to the users of the client computing devices 902, 904, 906, and/or 908. Users operating the client computing devices 902, 904, 906, and/or 908 may in turn utilize one or more client applications to interact with the server 912 to utilize the services provided by these components.

In the configuration depicted in FIG. 9, the software components 918, 920 and 922 of system 900 are shown as being implemented on the server 912. In other embodiments, one or more of the components of the system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

The client computing devices 902, 904, 906, and/or 908 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 910.

Although distributed system 900 in FIG. 9 is shown with four client computing devices, any number of client computing devices may be supported. Other devices, such as devices with sensors, etc., may interact with the server 912.

The network(s) 910 in the distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 912 can include one or more virtual machines running virtual operating systems, or other computing architectures involving virtualization. One or more flexible pools of logical storage devices can be virtualized to maintain virtual storage devices for the server. Virtual networks can be controlled by the server 912 using software defined networking. In various embodiments, the server 912 may be adapted to run one or more services or software applications described in the foregoing disclosure. For example, the server 912 may correspond to a server for performing processing as described above according to an embodiment of the present disclosure.

The server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 912 may include one or more applications to analyze and consolidate data feeds and/or event updates received from users of the client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 912 may also include one or more applications to display the data feeds and/or real-time events via one or more display devices of the client computing devices 902, 904, 906, and 908.

The distributed system 900 may also include one or more databases 914 and 916. These databases may provide a mechanism for storing information such as user identity information, and other information used by embodiments of the present disclosure. Databases 914 and 916 may reside in a variety of locations. By way of example, one or more of databases 914 and 916 may reside on a non-transitory storage medium local to (and/or resident in) the server 912. Alternatively, the databases 914 and 916 may be remote from the server 912 and in communication with the server 912 via a network-based or dedicated connection. In one set of embodiments, the databases 914 and 916 may reside in a storage-area network (SAN). Similarly, any necessary files for performing the functions attributed to the server 912 may be stored locally on the server 912 and/or remotely, as appropriate. In one set of embodiments, the databases 914 and 916 may include relational databases, such as databases provided by Oracle, that are adapted to store, update, and retrieve data in response to SQL-formatted commands.

Figure 10:
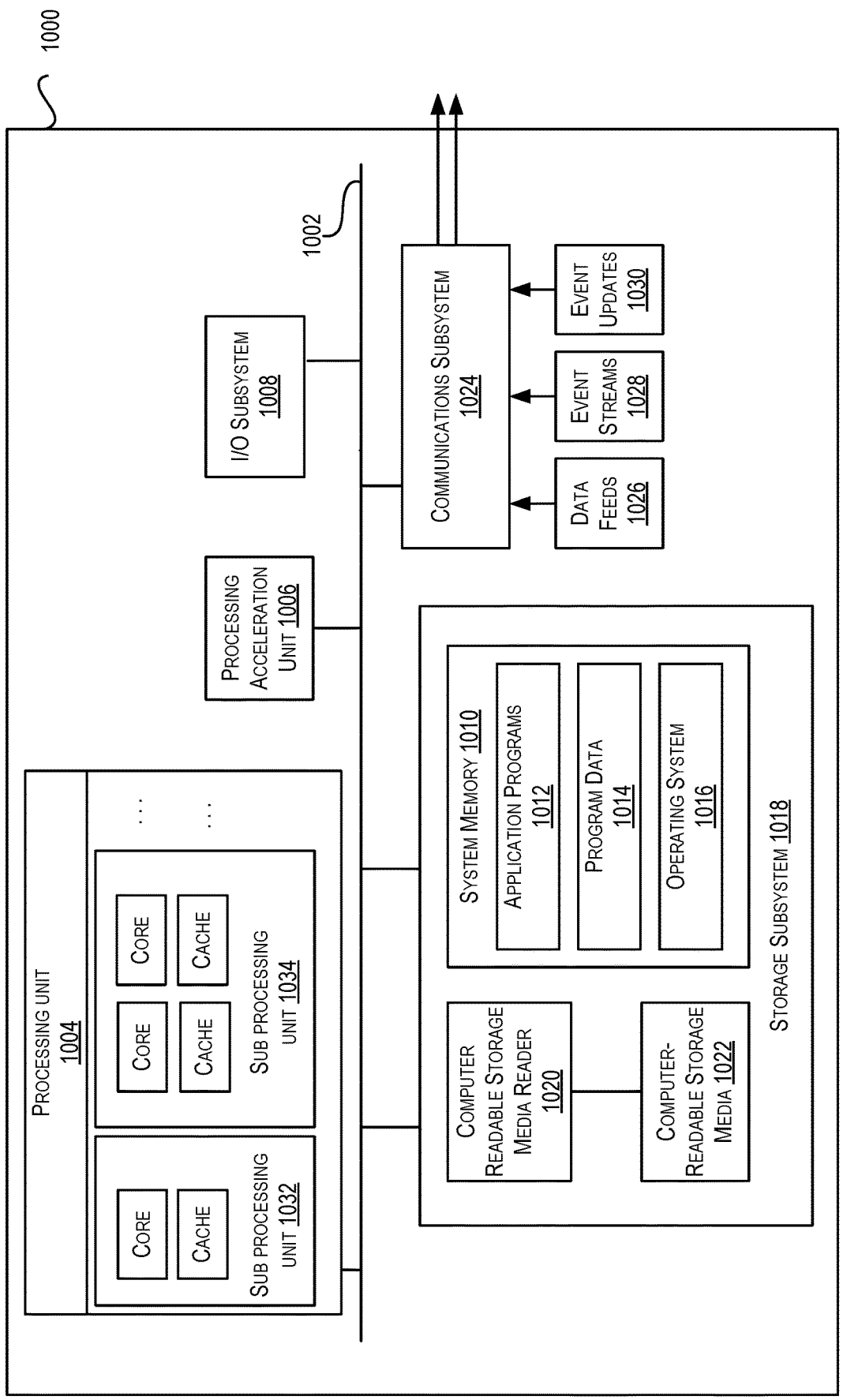
FIG. 10 is a simplified block diagram of one or more components of a system environment by which services provided by one or more components of an embodiment system may be offered as cloud services, in accordance with an embodiment of the present disclosure.

FIG. 10 illustrates an exemplary computer system 1000 that may be used to implement an embodiment of the present disclosure. In some embodiments, computer system 1000 may be used to implement any of the various servers and computer systems described above. As shown in FIG. 10, computer system 1000 includes various subsystems including a processing subsystem 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1010 including potentially on one or more storage devices. Through suitable programming, processing subsystem 1004 can provide various functionalities described above for dynamically modifying documents (e.g., webpages) responsive to usage patterns.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. Additionally, communication subsystem 1024 may be used to communicate notifications of successful logins or notifications to re-enter a password from the privileged account manager to the requesting users.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

Figure 11:
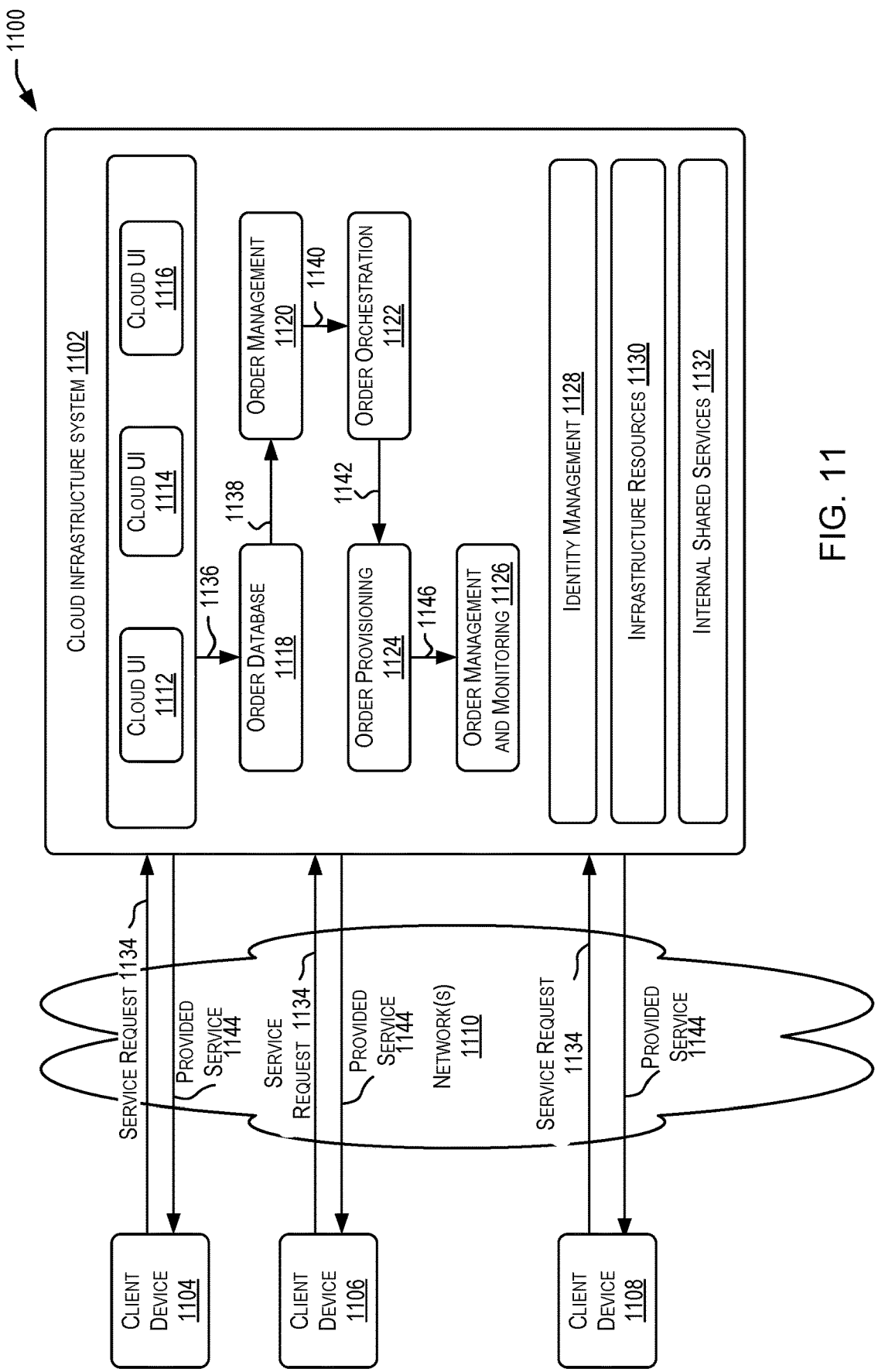
FIG. 11 illustrates an example computer system that may be used to implement an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the disclosure. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 902, 904, 906, and 908.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 910.

Cloud infrastructure system 1102 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102. At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method for distributing a continuous query, comprising:

receiving, by a computing device, a plurality of events in a stream;

deploying, by the computing device, a query plan for a continuous query to a master node and a plurality of worker nodes, a respective worker node of the plurality of worker nodes implementing a respective heartbeat propagator component and a respective continuous query engine, the master node implementing a timestamp tracker component configured to receive a plurality of timestamp values associated with the plurality of events;

distributing a first partition of the plurality of events to the master node and to a first worker node in the plurality of worker nodes;

distributing a second partition of the plurality of events to the master node and to a second worker node in the plurality of worker nodes;

configuring the master node to instruct a first heartbeat propagator component implemented on the first worker node to propagate a first heartbeat event to the first worker node for a second event received via the second partition;

configuring the master node to instruct a second heartbeat propagator component implemented on the second worker node to propagate a second heartbeat event to the second worker node for a first event received via the first partition;

receiving, from the first worker node, a first output identifying a first partition result, the first output being based at least in part on the first heartbeat event and the query plan;

receiving, from the second worker node, a second output identifying a second partition result, the second output being based at least in part on the second heartbeat event and the query plan;

combining, by the computing device, the first output and the second output into a single result corresponding to the continuous query; and outputting the single result corresponding to the continuous query for a user.

2. The method of claim 1, wherein:

a respective event of the plurality of events comprises a respective timestamp value;

the plurality of events are organized into batches; and wherein the timestamp tracker component is configured to:

receive, from the plurality of worker nodes, a plurality of highest partition timestamp values of a first batch;

select, from the plurality of highest partition timestamp values, a highest timestamp value of the first batch; and send the highest timestamp value of the first batch to the plurality of worker nodes.

3. The method of claim 1, wherein the first heartbeat event indicates a time associated with the second event in the second partition, and is propagated from the second worker node by shuffling or broadcasting to the plurality of worker nodes.

4. The method of claim 1, wherein the continuous query comprises a temporal relation with a time window.

5. The method of claim 1, wherein distributing the first partition is performed based at least in part on a load balancing function or a partitioning function.

6. The method of claim 1, wherein each event of the plurality of events comprises a timestamp and a value.

7. The method of claim 1, wherein the first partition result and the second partition result are combined based at least in part on a union operator.

8. The method of claim 1, wherein the respective heartbeat propagator component of the respective worker node propagates a plurality of heartbeats indicating times and received from each worker node other than the respective worker node.

9. A system, comprising:

a memory configured to store computer-executable instructions; and a processor configured to access the memory and execute the computer-executable instructions to perform a method for distributing a continuous query, the method comprising:

receiving a plurality of events in a stream;

deploying a query plan for a continuous query to a master node and a plurality of worker nodes, a respective worker node of the plurality of worker nodes implementing a respective heartbeat propagator component and a respective continuous query engine, the master node implementing a timestamp tracker component configured to receive a plurality of timestamp values associated with the plurality of events;

distributing a first partition of the plurality of events to the master node and to a first worker node in the plurality of worker nodes;

distributing a second partition of the plurality of events to the master node and to a second worker node in the plurality of worker nodes;

configuring the master node to instruct a first heartbeat propagator component implemented on the first worker node to propagate a first heartbeat event to the first worker node for a second event received via the second partition;

configuring the master node to instruct a second heartbeat propagator component implemented on the second worker node to propagate a second heartbeat event to the second worker node for a first event received via the first partition;

receiving, from the first worker node, a first output identifying a first partition result, the first output being based at least in part on the first heartbeat event and the query plan;

receiving, from the second worker node, a second output identifying a second partition result, the second output being based at least in part on the second heartbeat event and the query plan;

combining the first output and the second output into a single result corresponding to the continuous query; and outputting the single result corresponding to the continuous query for a user.

10. The system of claim 9, wherein:

a respective event of the plurality of events comprises a respective timestamp value;

the plurality of events are organized into batches; and wherein the timestamp tracker component is configured to:

receive, from the plurality of worker nodes, a plurality of highest partition timestamp values of a first batch;

select, from the plurality of highest partition timestamp values, a highest timestamp value of the first batch; and send the highest timestamp value of the first batch to the plurality of worker nodes.

11. The system of claim 9, wherein the first heartbeat event indicates a time associated with the second event in the second partition, and is propagated from the second worker node by shuffling or broadcasting to the plurality of worker nodes.

12. The system of claim 9, wherein the continuous query comprises a temporal relation with a time window.

13. The system of claim 9, wherein distributing the first partition is performed based at least in part on a load balancing function or a partitioning function.

14. The system of claim 9, wherein each event of the plurality of events comprises a timestamp and a value.

15. The system of claim 9, wherein the respective heartbeat propagator component of the respective worker node propagates a plurality of heartbeats indicating times and received from each worker node other than the respective worker node.

16. A non-transitory computer-readable medium storing computer-executable code that, when executed by a processor, cause the processor to perform a method for distributing a continuous query, the method comprising:

receiving a plurality of events in a stream;

deploying a query plan for a continuous query to a master node and a plurality of worker nodes, a respective worker node of the plurality of worker nodes implementing a respective heartbeat propagator component and a respective continuous query engine, the master node implementing a timestamp tracker component configured to receive a plurality of timestamp values associated with the plurality of events;

distributing a first partition of the plurality of events to the master node and to a first worker node in the plurality of worker nodes;

distributing a second partition of the plurality of events to the master node and to a second worker node in the plurality of worker nodes;

configuring the master node to instruct a first heartbeat propagator component implemented on the first worker node to propagate a first heartbeat event to the first worker node for a second event received via the second partition;

configuring the master node to instruct a second heartbeat propagator component implemented on the second worker node to propagate a second heartbeat event to the second worker node for a first event received via the first partition;

receiving, from the first worker node, a first output identifying a first partition result, the first output being based at least in part on the first heartbeat event and the query plan;

receiving, from the second worker node, a second output identifying a second partition result, the second output being based at least in part on the second heartbeat event and the query plan;

combining the first output and the second output into a single result corresponding to the continuous query; and outputting the single result corresponding to the continuous query for a user.

17. The non-transitory computer-readable medium of claim 16:
a respective event of the plurality of events comprising a respective timestamp value;
the plurality of events being organized into batches; and
wherein the timestamp tracker component is configured to:
receive, from the plurality of worker nodes, a plurality of highest partition timestamp values of a first batch;
select, from the plurality of highest partition timestamp values, a highest timestamp value of the first batch; and
send the highest timestamp value of the first batch to the plurality of worker nodes.

18. The non-transitory computer-readable medium of claim 16, wherein the continuous query comprises a temporal relation with a time window.

19. The non-transitory computer-readable medium of claim 16, wherein each event of the plurality of events comprises a timestamp and a value.

20. The non-transitory computer-readable medium of claim 16, wherein the first partition result and the second partition result are combined based at least in part on a union operator.

* * * * *

UNITED STATES PATENT AND TRADEMARK OFFICE
CERTIFICATE OF CORRECTION

PATENT NO. : 10,902,000 B2  
APPLICATION NO. : 16/121490  
DATED : January 26, 2021  
INVENTOR(S) : Bishnoi et al.

Page 1 of 1

It is certified that error appears in the above-identified patent and that said Letters Patent is hereby corrected as shown below:

In the Specification

In Column 5, Line 37, delete ""stock value."" and insert -- "stock_value." --, therefor.

In Column 23, Line 61, delete "hearbeats" and insert -- heartbeats --, therefor.

In Column 26, Line 3, delete "rdd.partiion" and insert -- rdd.partition --, therefor.

In Column 26, Line 39, delete "hearbeat" and insert -- heartbeat --, therefor.

In Column 26, Line 40, delete "creaeTuple" and insert -- createTuple --, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*